US010627369B2

(12) United States Patent
Mattei

(10) Patent No.: US 10,627,369 B2
(45) Date of Patent: Apr. 21, 2020

(54) METHOD AND DEVICE FOR INSPECTION OF SOLIDS BY MEANS OF ULTRASOUND

(71) Applicant: Creo Dynamics AB, Linkoping (SE)

(72) Inventor: Christophe Mattei, Linkoping (SE)

(73) Assignee: Creo Dynamics AB, Linköping (SE)

( * ) Notice: Subject to any disclaimer, the term of this patent is extended or adjusted under 35 U.S.C. 154(b) by 549 days.

(21) Appl. No.: 15/301,440

(22) PCT Filed: Mar. 26, 2015

(86) PCT No.: PCT/SE2015/050367
§ 371 (c)(1),
(2) Date: Oct. 3, 2016

(87) PCT Pub. No.: WO2015/152795
PCT Pub. Date: Oct. 8, 2015

(65) Prior Publication Data
US 2017/0023527 A1 Jan. 26, 2017

(30) Foreign Application Priority Data
Apr. 3, 2014 (SE) ........................................ 1450404

(51) Int. Cl.
*G01N 29/04* (2006.01)
*G01N 29/30* (2006.01)
(Continued)

(52) U.S. Cl.
CPC ........... *G01N 29/04* (2013.01); *G01N 29/075* (2013.01); *G01N 29/11* (2013.01); *G01N 29/225* (2013.01);
(Continued)

(58) Field of Classification Search
CPC .. G01N 29/2487; G01N 29/32; G01N 29/323; G01N 29/40; G01N 29/44;
(Continued)

(56) References Cited

U.S. PATENT DOCUMENTS 4,252,022 A * 2/1981 Hurwitz ............. G01N 29/0663
73/582
5,033,304 A * 7/1991 Rosen .................... G01N 29/07
73/597
(Continued)

FOREIGN PATENT DOCUMENTS

WO    WO 2009/087342 A1    7/2009
WO    WO 2010/110716 A1    9/2010

OTHER PUBLICATIONS

International Search Report and Written Opinion for corresponding Patent Application No. PCT/SE2015/050367 dated Jul. 27, 2015.

*Primary Examiner* — John Fitzgerald
*Assistant Examiner* — Truong D Phan
(74) *Attorney, Agent, or Firm* — Renner, Otto, Boissell & Sklar, LLP

(57) ABSTRACT

A method, a computer program and a system for ultrasonic inspecting of objects is provided. The method comprises positioning (103) a measuring device (11) comprising a plurality of transducers (12) on the inspected object (20) and performing a number of test signal acquisitions (103). Each acquisition includes using one transducer to induce an ultrasonic signal into the test object, and using at least one other transducer to receive an ultrasonic test signal. The inspecting further comprises determining (105, 205) the influence of contact surface variations between each test signal and a reference signal; compensating (106, 206) the full test signal for the contact surface variations; and determining (109) a residual signal. The system comprises a computing device (30), and a measuring system (13) communicatively connected to the computing device (30). The measuring system (13) includes an ultrasound unit (19) and a measuring device (11) provided with a plurality of transducers (12). The computing device (30) comprises a calibrator (303) to determine (105, 205) the influence of contact (Continued)

surface variations, and compensate (106, 206) the test signal. The computing device (30) comprises a residual calculator (304) to determine (109) the residual signal.

18 Claims, 12 Drawing Sheets

(51) Int. Cl.
    *G01N 29/07* (2006.01)
    *G01N 29/44* (2006.01)
    *G01N 29/11* (2006.01)
    *G01N 29/22* (2006.01)
    *G01N 29/42* (2006.01)
    *G01N 29/32* (2006.01)

(52) U.S. Cl.
    CPC ............ *G01N 29/30* (2013.01); *G01N 29/323* (2013.01); *G01N 29/42* (2013.01); *G01N 29/4427* (2013.01); *G01N 29/4436* (2013.01); *G01N 2291/012* (2013.01)

(58) Field of Classification Search
    CPC ............... G01N 29/48; G01N 29/4409; G01N 29/4427; G01N 29/4436; G01N 29/4445; G01N 29/4454; G01N 29/4463; G01N 2291/012; G01N 2291/10; G01N 2291/102; G01N 2291/103; G01N 2291/104; G01N 2291/105; G01N 2291/106; G01N 29/04; G01N 29/075; G01N 29/42; G01N 29/225; G01N 29/114; G01N 29/30; G01N 2291/044; G01N 29/07; G01N 29/24
    USPC .......................... 73/624, 602, 628, 627, 641
    See application file for complete search history.

(56) References Cited

U.S. PATENT DOCUMENTS

| | | | |
|---|---|---|---|
| 5,280,724 A * | 1/1994 | Higo | ...................... G01N 29/24 310/336 |
| 7,654,142 B2 | 2/2010 | Dominguez et al. | |
| 2007/0144263 A1 | 6/2007 | Fei et al. | |
| 2007/0215823 A1 | 9/2007 | Dominguez et al. | |

\* cited by examiner

Direct Signal

Direct Signal / Time window Tc

Residual without phase compensation

Residual with phase compensation

METHOD AND DEVICE FOR INSPECTION OF SOLIDS BY MEANS OF ULTRASOUND

This application is a national phase of International Application No. PCT/SE2015/050367 filed Mar. 26, 2015 and published in the English language, which claims priority to Swedish Patent Application No. SE 1450404-7 filed Apr. 3, 2014, which are hereby incorporated herein by reference in their entirety.

BACKGROUND OF THE INVENTION AND PRIOR ART

The invention relates to nondestructive inspection of solid materials using ultrasonic waves. Especially, the invention relates to a method for determining a residual between a reference signal and a test signal of an inspected solid material, and to a system for providing such a residual. An image of any defect of the inspected material can be calculated from the residual.

Different methods for non-destructive inspection of fluid and solid materials using ultrasound techniques have been developed. Such methods include transmitting an ultrasonic signal into the material and measuring a resulting ultrasonic signal that has travelled through the material at a measuring point, which resulting ultrasonic signal for example has been reflected inside the material before arriving at the measuring point. The analyzing of the resulting ultrasonic signal provides an image of the interior of the material.

Ultrasonic inspection of fluids may start from analysis of pressure. The arrival times of pressure wave echoes give an indication of a distance to a pressure altering structure in the fluid.

The problem of inspecting solids is generally more difficult since solid materials may contain and transfer stress from both compression and shear. Solid materials therefore transfer energy in the form of shear waves as well as compression waves. Ultrasonic inspection of solids is often based on an analysis of a strain field in the material, which strain field may corresponds to compression and shear in the material. The propagation speed of shearing waves is different from the speed of propagation of compression waves, and the measurements and the analysis of the measured signal need to be performed in a more sophisticated manner than for fluids.

One common method uses a short ultrasonic pulse and analysis of the response. One known way of analyzing the resulting measured ultrasonic signal from an inspected part of a construction is to compare the measured signal to a reference signal obtained from a flawless part. Such a reference signal may also be provided from a FEM analysis (Finite Element Method) of the part. The comparison provides a residual signal, which is subsequently analyzed.

Mathematical calculations of how ultrasonic signals from small sources in such a part would produce measurable signals at the measuring position is used to determine an indication of the disturbances in the inspected part that may have produced the residual signal.

Thus, the calculations of a forward, or direct, problem of how small sources produce ultrasonic signals propagating through a material is used as a basis for solving the adjoint, or inverse, problem of what sources, i.e. defects, have produced the residual signal.

U.S. Pat. No. 7,654,142 describes a method for obtaining an image of an inspected part. In this method, a reference part is used, which reference part is a flawless part. A first ultrasonic measurement is performed on the reference part, and a second ultrasonic scan is performed on the inspected part. The measuring probe is positioned in the same relation to the reference part as the inspected part during the measurements, at the same height above a corresponding plane to be inspected. A subtraction is performed between the measurements of the inspected part and the reference part, and the topological energy at each position in the part is determined.

The method of U.S. Pat. No. 7,654,142 determines a "cost function" that correlates data obtained from the reference part and data obtained from measuring the inspected part. In this way an indication of the modifications, or defects, in the inspected part is obtained.

In more detail, the measuring probe includes a number of aligned transducers. The transducers transmit an ultrasonic test signal, one transducer at a time, while the other transducers receives. A matrix of all the received test signals are created, which received test signals are compared to corresponding reference test signals from the reference part. The frequency used for the ultrasonic signals is not indicated, but each measuring results in measurements from a plane of the inspected part.

The method of U.S. Pat. No. 7,654,142 uses the topological energy for providing an image of the inspected part. U.S. Pat. No. 7,654,142 aims at simplifying a previous method described in the article "Flaw imaging with ultrasound: the time domain topological gradient method" by N. Dominguez et al (A1, see the reference list at the end of the description). Both methods are performed in the time-domain, but U.S. Pat. No. 7,654,142 determines the topological energy instead of the gradient for each position of the inspected part. In more detail, the field values of the reference part is subtracted from the measured values of the inspected part, thereafter the subtracted residual signal is subjected to a time reversal by inverting the time scale. This time reversal is described in more detail in the article "Flaw imaging . . . " and in a further article "Time domain topological gradient and time reversal analogy: an inverse method for ultrasonic target detection" (A2, see the reference list).

A problem for using the methods described in U.S. Pat. No. 7,654,142 and the articles A1 and A2 are to obtain an accurate measurement, i.e. how to avoid disturbances to the ultrasonic test signal when applying the ultrasonic test signal to the inspected part and to avoid disturbances when measuring the resulting signal. The process suggested in article A2 is to use water as a transfer medium to transfer the ultrasonic test signal from the transducer into the inspected part for example, as referred to in the article A2 by immersion of the inspected part in water.

A known alternative to immerse the inspected part in water is to direct a beam of water onto the inspected part and use the water beam as a means for transferring the ultrasonic signal.

A disadvantage of using water is that immersing parts in water baths or directing beams of water onto inspected parts makes the handling of parts for inspection complicated, especially for larger parts and structures.

An alternative to water immersion that may be used is attaching the transmitting and measuring probes permanently to the surface of the inspected part. Such attachment may be done on a flawless part during manufacturing and subsequently used for regular inspections. In this way, the distortion induced from the glue layer will be the same and the measurement signal obtained during an inspection can be compared to an original test signal obtained during manufacturing so that the distortion from the glue layer will not influence the difference between the original reference signal and the subsequent test signal. However, for many parts and constructions it may not be suitable to leave measuring probes attached during use, and also the glue layer may be affected during use of such parts and constructions.

Thus, there is a need for facilitating the measuring process, still providing accurate measurement signals, in order to determine a reliable residual signal.

SUMMARY OF THE INVENTION

According to a first aspect of the invention, the invention provides a method for inspecting objects by means of ultrasound, wherein reference signals are used as references for test signals in order to establish one or more residuals indicating flaws in the objects. The method of inspection comprises:
inspecting a test object at one or more positions, wherein the inspecting of one position comprises:
positioning a measuring device comprising a plurality of transducers in a selected position on the inspected object, so that the ultrasonic transducers are in contact with the inspected object,
performing a number of test signal acquisitions at the selected position, each test signal acquisition comprising:
using one transducer of the plurality transducers as a sending probe to induce an ultrasonic signal into the test object, and using at least on other transducer of the transducers as a receiving probe to receive ultrasonic signals from the test object, so that one test signal is obtained for each combination of sending probe and receiving probe. The inspecting of one position further comprises:
determining the influence of contact surface variations between each test signal and corresponding reference signal;
compensating the full test signal for the influence of contact surface variations; and
determining a residual based on the compensated test signal for each combination.

An advantage is that the method does not require any "a-priori" knowledge of how the wave of the test signal propagates in the structure of the inspected object. The residual is determined from the reference signal and the compensated test signal and will indicate if a defect is present in the inspected object.

A preferred embodiment includes extracting a direct signal portion of the test signal, and determining the influence of contact surface variations based on the direct signal portion of the test signal and a corresponding direct signal portion of the reference signal.

The compensating is performed for the full test signal. The full test signal includes the direct signal portion of the test signal and a reflected signal portion of the test signal.

Preferably, the determining of the residual includes performing a subtraction of the full reference signal and the compensated full test signal.

Preferably, the determining of the influence of contact surface variations comprises identifying a time window for a direct signal transmission of the combination of sending probe and receiving probe, and using the direct signals of the test signal and the reference signal of said time window. The time window of the direct signal from the sending probe to the receiving probe of each combination is a sub-portion of the total reception time period of the full test signal.

In an embodiment, the determining of the influence of contact surface variations comprises determining a phase shift between the test signal and the reference signal, and the compensating includes compensating the full test signal for the determined phase shift.

This can be seen as a way of aligning the acquired test signal and the corresponding reference signal.

In an embodiment, the step determining of the influence of contact surface variations also comprises determining an amplitude variation between the test signal and the reference signal, and the compensating further includes normalizing the amplitude of the full test signal and/or the reference signal in accordance with the determined amplitude variation.

In an embodiment, the determining of the influence of contact surface variations includes determining a frequency varying filter equivalent for the contact surface, and the compensating includes compensating the full test signal on the basis of the determined filter equivalent.

In an embodiment, the inspecting includes evaluating the level of the residual.

In an embodiment, the evaluating of the residual level includes comparing a measure of the residual, or the residual, to a threshold, and indicating to an operator when the measure of the residual exceeds the threshold.

In an embodiment, the inspecting includes obtaining the reference signal from a reference zone of the inspected object, or from a reference zone of a reference object.

In an alternative embodiment, the reference signal is obtained from simulations, such as FEM simulations (Finite Element Method), in a computer model of the test object.

In an embodiment, the induced ultrasound signal has a frequency of less than 1 MHz, preferably between 50 kHz and 500 kHz, especially between 100 and 250 kHz. Using a frequency lower than 1 MHz provides a spreading of the ultrasonic signal within many materials, and makes it possible to inspect a larger area, or inspection zone, at each position. These frequencies are suitable for inspection using Lamb waves. Especially, the frequency can be selected to provide Lamb waves propagating in an inspected plate-like object. To create the Lamb waves, the frequency is selected based on the elastic properties of the material of the inspected object and on the thickness of the inspected plate-like object. The plate-like object will then act as a guide for the propagation of the Lamb waves. By choosing such a frequency, the inspection is especially suitable for inspecting plate-like structures such as aerospace structures. Thus, in preferred embodiments, the frequency is selected to create Lamb waves in the inspected object. However, these frequencies are also suitable for other waves in solid objects of large dimensions, such as a solid concrete construction having a non-plate shape.

According to a second aspect, the invention also provides a system for inspecting an object by means of ultrasound. The inspection system comprises:
a computing device, and
a measuring system configured to acquire test signals from the inspected object, which the measuring system is communicatively connected to the computing device for transferring the test signals from the measuring system to the computing device. The measuring system includes an ultrasound unit and a measuring device provided with a plurality of transducers, wherein each test signal is obtained by using one of the transducers as a sending probe and another one of the transducers as a receiving probe. The computing device is configured to establish a residual by comparing each test signal with a corresponding reference signal in order to detect flaws in the inspected object. The inspection system is characterized in that the computing device comprises a calibrator configured to:

determine the influence of contact surface variations between each test signal and the corresponding reference signal by using a direct signal portion of the test signal and a direct signal portion of reference signal, and compensate the full test signal for the influence of contact surface variations; and in that the computing device comprises: a residual calculator configured to determine the residual based on the compensated test signal and the reference signal.

In an embodiment of this aspect, the calibrator is adapted to determine the influence of contact surface variations by determining a phase shift between the test signal and the reference signal, and to compensate the full test signal for the determined phase shift.

In an embodiment of this aspect, the calibrator is further adapted to determine the influence of contact surface variations by determining an amplitude difference between the test signal and the reference signal, and to compensate the test signal by performing an amplitude normalization of the full test signal and the reference signal.

In an embodiment of this aspect, the calibrator is adapted to determine the influence of contact surface variations by determining a frequency varying filter equivalent and to compensate the full test signal on the basis of the determined filter equivalent.

In an embodiment of this aspect, the computing device further comprises:

a residual evaluator configured to compare a measure or the residual to a threshold, and an output configured for indicating to an operator when the measure of the residual exceeds the threshold by means of the measuring system or by means of a monitor.

In an embodiment of this aspect, the ultrasound unit is adapted to provide ultrasound signals at a frequency of less than 1 MHz, preferably between 50 kHz and 500 kHz, especially between 100 and 250 kHz. Especially, the frequency is selected to create Lamb waves in the inspected object. Thus, the ultrasound unit is adapted for frequencies that when induced by the transducer, which acts as sending probe, create Lamb waves in the inspected object.

According to a third aspect, the invention also provides a computer program product for determining a residual from test signals acquired by means of ultrasound from an inspected object and reference signals. The computer program product comprises a computer program that when run on a computer enables the computer to perform the steps of:

extracting a direct signal portion of each test signal;

determining the influence of contact surface variations between the direct portion of the test signal and a corresponding portion of the reference signal;

compensating each test signal for the influence of contact surface variations; and determining a residual based on the compensated test signal and the corresponding reference signal.

In an embodiment of this aspect, the step of determining the influence of contact surface variations comprises determining a frequency varying filter equivalent for the contact surface, and the step of compensating includes compensating the test signal on the basis of the determined filter equivalent In an embodiment of this aspect, the step of determining the influence of contact surface variations comprises determining a phase shift between the test signal and the reference signal, and determining an amplitude difference between the test signal and the reference signal, and the step of compensating includes compensating the test signal for the determined phase shift, and normalizing the amplitude of the test signal and/or the reference signal in accordance with the determined amplitude variation.

SHORT DESCRIPTION OF THE DRAWINGS

Embodiments of the invention will be described with reference to the drawings wherein.

DESCRIPTION OF EMBODIMENTS

With reference to FIGS. 1-4 some main principles of a theoretical basis for the embodiments of the invention will be explained, so as to simplify implementation of the invention.

Figure 1:
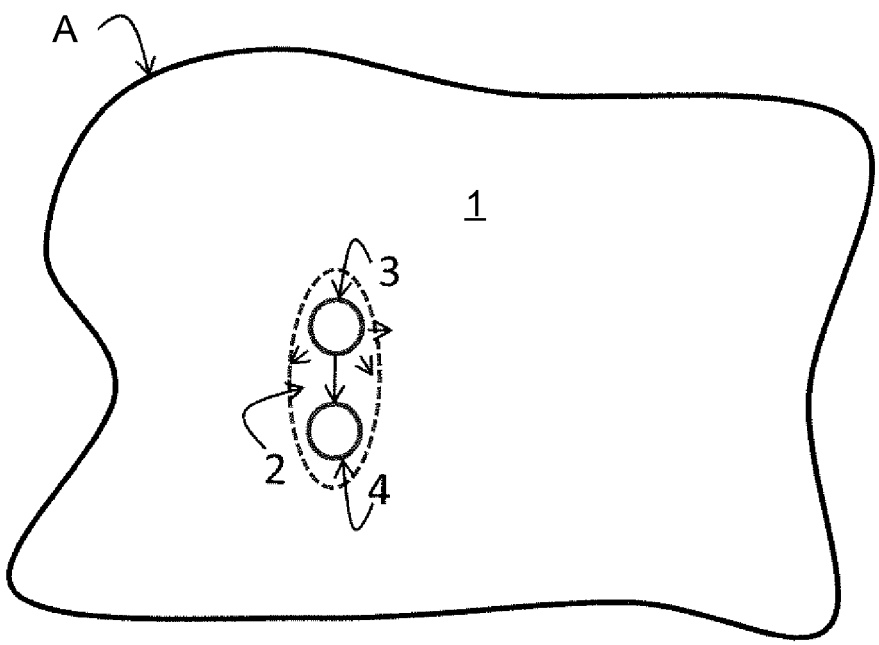
FIG. 1 illustrates measuring of a reference object in accordance with an embodiment of the invention.

FIG. 1 illustrates a reference zone 1 on a flawless reference object A. An ultrasonic sending probe 3 and an ultrasonic receiving probe 4 are placed in the reference zone 1 of the reference object A. The sending probe 3 and the receiving probe 4 are positioned in contact with the reference object A. An ultrasonic pulse signal, or excitation signal, induced by the sending probe 3 propagates in the object A in all directions. It should be noted that the sending probe 3

(and the sending probe 7 in FIG. 2) should act as a point source and therefore should have a diameter less than half the wavelength of the induced signal. Especially, a part of the excitation signal propagates to, and is received by the receiving probe 4. When a calibration is performed, in accordance with the invention, the direct signal from the sending probe 3 to the receiving probe 4 can be used. The direct signal propagates through a zone located between the sending probe 3 and the receiving probe 4, which is illustrated as a calibration zone 2 in FIG. 1.

Figure 2:
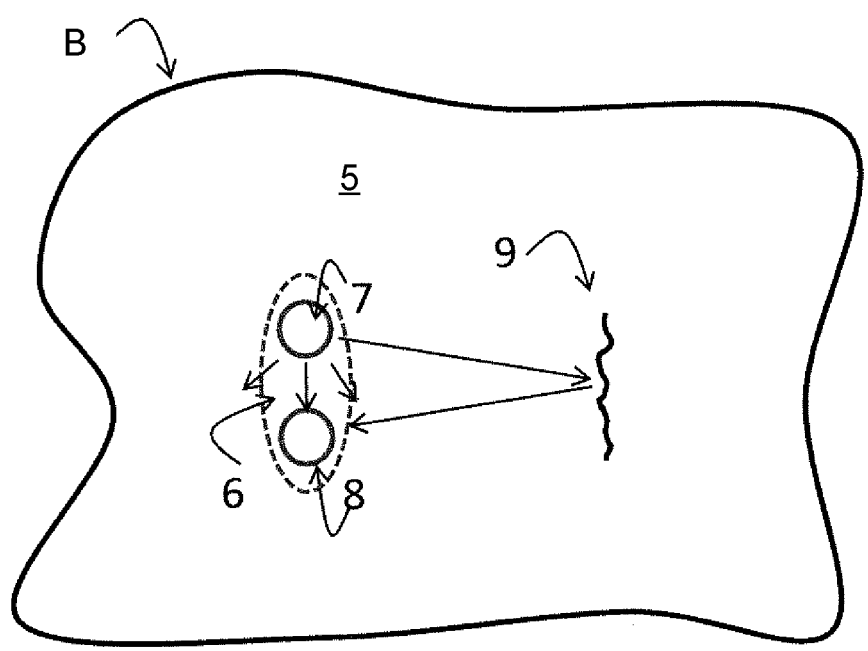
FIG. 2 illustrates measuring an inspected object in accordance with an embodiment of the invention.

FIG. 2 illustrates an inspected zone 5 of an inspected object B, which has a defect 9 in its structure. A sending probe 7 and a receiving probe 8 are arranged in contact with the inspected object B in the inspected zone 5. For the purposes of calibration, the direct signal propagating in a calibration zone 6 between the sending probe 7 and the receiving probe 8 is used.

The present invention provides a method of calibration using the direct signals propagating through the calibration zones 2 and 6. This calibration method will be described mathematically in the following.

Referring to FIG. 1. The transfer of the direct signal, from the sending probe 3 to the receiving probe 4, through the calibration zone 2 during calibration can be mathematically described in the time domain as follows:

$$r_4(t)=s(t)*h_3(t)*k_3*G_{34}(t)*k_4*h_4(t) \qquad \text{eq. 1}$$

which in the frequency domain is equivalent to:

$$R_4(\omega)=S(\omega) \cdot H_3(\omega) \cdot K_3 \cdot G_{34}(\omega) \cdot K_4 \cdot H_4(\omega) \qquad \text{eq 2}$$

wherein:
$r_4$ is the time domain signal received and measured by the receiving probe 4;
s is the excitation signal induced by the sending probe 3 in the reference zone 1 of reference object A;
$h_3$ and $h_4$ are the respective transfer function (i.e. the response) of the sending probe 3 and the receiving probe 4;
$k_3$ and $k_4$ are the respective filtering effect of the contact between the sending probe 3 and the reference object A, and between the receiving probe 4 and the reference object A; and
$G_{34}$ is the Green function that describes the propagation between the sending probe 3 and the receiving probe 4 through the reference zone 1 of reference object A, i.e. through the calibration zone 2;

Referring to FIG. 2. The transfer from sending probe 7 to receiving probe 9 of a direct signal through the calibration zone 6 and a signal reflected by the defect 9 can be mathematically described in the time domain as follows:

$$r_8(t)=s(t)*h_7(t)*k_7*G_{78}(t)*k_8*h_8(t)+s(t)*h_7(t)*k_7*G_{798}(t)*k_8*h_8(t) \qquad \text{eq. 3}$$

which in the frequency domain is equivalent to:

$$R_8(\omega)=S(\omega) \cdot H_7(\omega) \cdot K_7 \cdot G_{78}(\omega) \cdot K_8 \cdot H_8(\omega)+S(\omega) \cdot H_7(\omega) \cdot K_7 \cdot G_{798}(\omega) \cdot K_8 \cdot H_8(\omega) \qquad \text{eq. 4}$$

wherein:
$r_8$ is the time domain signal received and measured by the receiving probe 8;
s is the excitation signal induced by the sending probe 7 in the inspected zone 5 of the inspected object B;
$h_7$ and $h_8$ are the respective transfer function (i.e. the response) of the sending probe 7 and the receiving probe 8;
$k_7$ and $k_8$ are the respective filtering effect of the contact between the sending probe 7 and the inspected object B, and between the receiving probe 8 and the inspected object B;
$G_{78}$ is the Green function that describes the direct propagation between the sending probe 7 and the receiving probe 8 through the calibration zone 6 of the inspected object B;
$G_{798}$ is the Green function that describes the reflected signal, i.e. the propagation from the sending probe 7 to the defect 9, the interaction of the signal wave with the defect 9 and the propagation from the defect 9 to the receiving probe 8.

To extract the contribution of the defect, i.e. $G_{798}$ the same pair of probes (3, 4) should be used on the inspected object B as on the reference object A. Also, the excitation signal s(t) used should be the same. Thus, a pair of probes 3, 4 are used for a first measurement in the reference zone 1 on the reference object A and subsequently the same pair of probes 3, 4 are used in the inspected zone 5 on the inspected object B.

The responses $h_3$ and $h_7$ are the same, and the responses $h_4$ and $h_8$ are the same, so that:

$$h_3(t)*h_4(t)=h_7(t)*h_8(t)=hh(t) \qquad \text{eq. 5}$$

Also, the reference object A and the inspected object B are selected so that the propagation zones, i.e. the reference zone 1, the inspected zone 5, and especially the calibration zones 2 and 6 have the same, or at least very similar, material and geometry, so that:

$$G_{34}=G_{78}=G \qquad \text{eq. 6}$$

The filtering effect from the contacts between the probes and the reference object A and inspected object B, respectively, can be described as:

$$K_n=A_n e^{j\varphi_n} \qquad \text{eq. 7}$$

wherein A is a loss factor and $\varphi$ is a phase shift.

Note, however, that a more general model of filtering effects arising from the contacts between the probes and the objects will be given in eq. 17.

Referring to eq. 7, $K_7*K_8$ can be written:

$$K_7 K_8 = A_7 A_8 e^{j(\varphi_7+\varphi_8)} = A_{78} e^{j(\varphi_{78})} \qquad \text{eq. 8}$$

and $K_3*K_4$ can be written:

$$K_3 K_4 = A_3 A_4 e^{j(\varphi_3+\varphi_4)} = A_{34} e^{j(\varphi_{34})} \qquad \text{eq. 9}$$

When the calibration zones 2 and 6 are much smaller than the inspection zone 5 that includes the defect 9, the time domain signal $r_8$ will not include any contribution from the signal reflected by the defect 9 during an initial time period (or calibration time) Tc. This means that $r_8$ can be described by:

$$r_8(0 < t < Tc) = s(t) * h_7(t) * k_7 * G_{78}(t) * k_8 * h_8(t) = \qquad \text{eq. 10a}$$
$$= A_{78} e^{j(\varphi_{78})} * hh(t) * G(t) * s(t)$$

and $$r_8(t > Tc) = \qquad \text{eq. 10b}$$
$$A_{78} e^{j(\varphi_{78})} * hh(t) * G(t) * s(t) + A_{78} e^{j(\varphi_{78})} * hh(t) * G_{798}(t) * s(t)$$

In the same way the time domain signal for the reference object A does not include any contribution from a defect, so that $$r_4(t)=A_{34} e^{j(\varphi_{34})}*hh(t)*G(t)*s(t) \qquad \text{eq. 11}$$

During the initial time period Tc the received signals $r_4$ and $r_8$ will be similar, and this may be used for determining the contribution $G_{798}$ (t) of the defect 9 in the received signal after the initial time period Tc. The received signals $r_4$ and $r_8$ will, however, differ in respect of the amplitudes $A_{34}$, $A_{78}$ and the phases $\omega_{34}$, $\omega_n$. The amplitudes $A_{34}$, $A_{78}$ and phases $\omega_{34}$, $\omega_n$ differ because of the difference in the filtering effects caused when applying the probes in contact with the reference object A and the inspected object B, respectively (see eq. 7).

The received signals $r_4(0<t<Tc)$ in the reference zone 1 of the reference object A, and $r_8(0<t<Tc)$ in the inspected zone 5 of the inspected object B, respectively (see eq. 10a and eq. 11), during the initial time period Tc can be normalized:

$$A = \frac{A_{78}}{A_{34}} \qquad \text{eq. 12}$$

and using a cross-correlation of these received signals $r_4(0<t<Tc)$ and $r_8(0<t<Tc)$, the phase difference, or phase shift, $\Delta$ between the received signals can be determined:

$$\Delta = \varphi_{78} - \varphi_{34} \qquad \text{eq. 13}$$

Thus, the influence of the differences of the filtering effects, i.e. differences in the contact between each probe and the objects, can be determined from the measured signals, i.e. received signals, of the initial time period Tc. This time period Tc may therefore be used for calibration, and referred to as a calibration time window.

Applying the normalization factor A (of eq. 12) and the phase shift (of eq. 13) to the received signal $r_4$ (of eq. 11) in the reference object 1 gives:

$$Ae^{j(\Delta)}r_4(t) = \frac{A_{78}}{A_{34}} A_{34} e^{j(\varphi_{34})} e^{j(\theta_{78} - \varphi_{34})} * hh(t) * G(t) * s(t) = \qquad \text{eq. 14}$$
$$= A_{78} e^{j(\varphi_{78})} * hh(t) * G(t) * s(t)$$

As can be seen eq. 14 relates the received signal $r_4$ of the reference object A to the received signal of the inspected object B.

In order to determine a time signal that is only depending on the presence and influence of the defect 9, the left hand and right hand sides of eq. 14 are subtracted from the left hand and right hand sides eq. 10B, which describes the received signal $r_8$ in the inspected object B after the initial time period (t>Tc):

$$r_8(t) - Ae^{j(\Delta)}r_4(t) = + A_{78} e^{j(\varphi_{78})} * hh(t) * G_{798}(t) * S(t) \qquad \text{eq. 15}$$

$$\text{and thus } r_8(t) - Ae^{j(\Delta)} * r_4(t) = \text{residual}(t) \qquad \text{eq. 16}$$

It should be noted that the residual is independent from the Green functions G(t). Thus, the presence of a defect or flaw can be detected from the residual without knowledge of how the wave of the signal propagates in the inspected object, i.e. without knowledge of any Green function G(t).

If there are no other reflections than the defect 9 during the total inspection time period, then $r_4(t)$ will be null after the initial time period Tc. However, normally there are other reflections as well. Since the influences of the difference of contact between the probes and objects, as described by the amplitude normalization A and the phase shift $\Delta$, are determined from the received signals $r_4$ and $r_8$ during the initial time period Tc, the influence from the defect 9 can be determined as described by eq. 15 since the other reflections are the same in the reference zone 1 of the reference object A and the inspected zone 5 of the inspected object B. In this way a residual (eq. 16) can be obtained, which will only indicate the defect 9.

As an alternative, or complement, to using the model of the filtering effect described in eq. 7, a more general filtering model is provided. It is suggested that a more general filtering model that also considers frequency dependency of the phase shift and amplitude variations during the initial time period Tc is used. In the frequency domain:

$$K_n(\omega) = A_n(\omega) e^{j\varphi_n(\omega)} \qquad \text{eq. 17}$$

Using the filter model of eq. 17, for the reference zone (see eq. 2) during t<Tc, the reference signal in the frequency domain is:

$$R_4(\omega) = S(\omega) \cdot H_3(\omega) \cdot K_3(\omega) \cdot G_{34}(\omega) \cdot K_4(\omega) \cdot H_4(\omega) \qquad \text{eq. 18}$$

The received signal $R_8$ in the inspected zone during t<Tc (see eq. 4) with the filter model of eq. 17:

$$R_8 = S(\omega) \cdot H_7(\omega) \cdot K_7(\omega) \cdot G_{78}(\omega) \cdot K_8(\omega) \cdot H_8(\omega) \qquad \text{eq. 19}$$

Using eq. 5 ($h_3(t)*h_4(t) = h_7(t)*h_8(t)$) $R_8$ can be rewritten as:

$$R_8(\omega) = \qquad \text{eq. 20}$$
$$S(\omega) \cdot H_3(\omega) \cdot K_3(\omega) \cdot G_{34}(\omega) \cdot K_4(\omega) \cdot H_4(\omega) \cdot \frac{K_7(\omega) \cdot K_8(\omega)}{K_3(\omega) \cdot K_4(\omega)}$$

thus:

$$R_8(\omega) = R_4(\omega) \cdot \frac{K_7(\omega) \cdot K_8(\omega)}{K_3(\omega) \cdot K_4(\omega)} \qquad \text{eq. 21}$$

wherein the contact filter CF($\omega$) can be defined as:

$$CF(\omega) = \frac{K_7(\omega) \cdot K_8(\omega)}{K_3(\omega) \cdot K_4(\omega)} = A_f(\omega) e^{j\varphi_f(\omega)} \qquad \text{eq. 22}$$

wherein f denotes filter.

To determine CF($\omega$), the direct signals of $R_8(\omega)$ and $R_4(\omega)$, received during the calibration time t<Tc, are compared. CF($\omega$) can be determined using a known system identification technique, such as any of:

a) a frequency response estimate;
b) a time domain correlation analysis for estimation of the finite impulse response (FIR); or
c) a transfer function estimate.

Such analysis can for example be made as presented in "System identification, Theory for user, by L. Ljung, Prentice Hall" (A3).

The residual can be determined from (compare eq. 16):

$$\text{residual}(t) = r_8(t) - CF(t) * r_4(t) \qquad \text{eq. 23}$$

The residual is determined for the total inspection time period, i.e. also for t>Tc, by convolution.

Once again, the residual is independent from the Green functions G(t). The presence of a defect can, thus, be determined by only using the test signal $r_8(t)$ and the reference signal $r_4(t)$.

Thus, the general filter CF(t) is determined in the frequency domain by means of the direct signals $r_4$ and $r_8$ received during the initial time period Tc, and the general filter is subsequently applied to the total reference signal $r_4$ for subtraction from the received signal $r_8$ of the inspected zone, i.e. also for t>Tc, to provide the residual.

Figure 3:
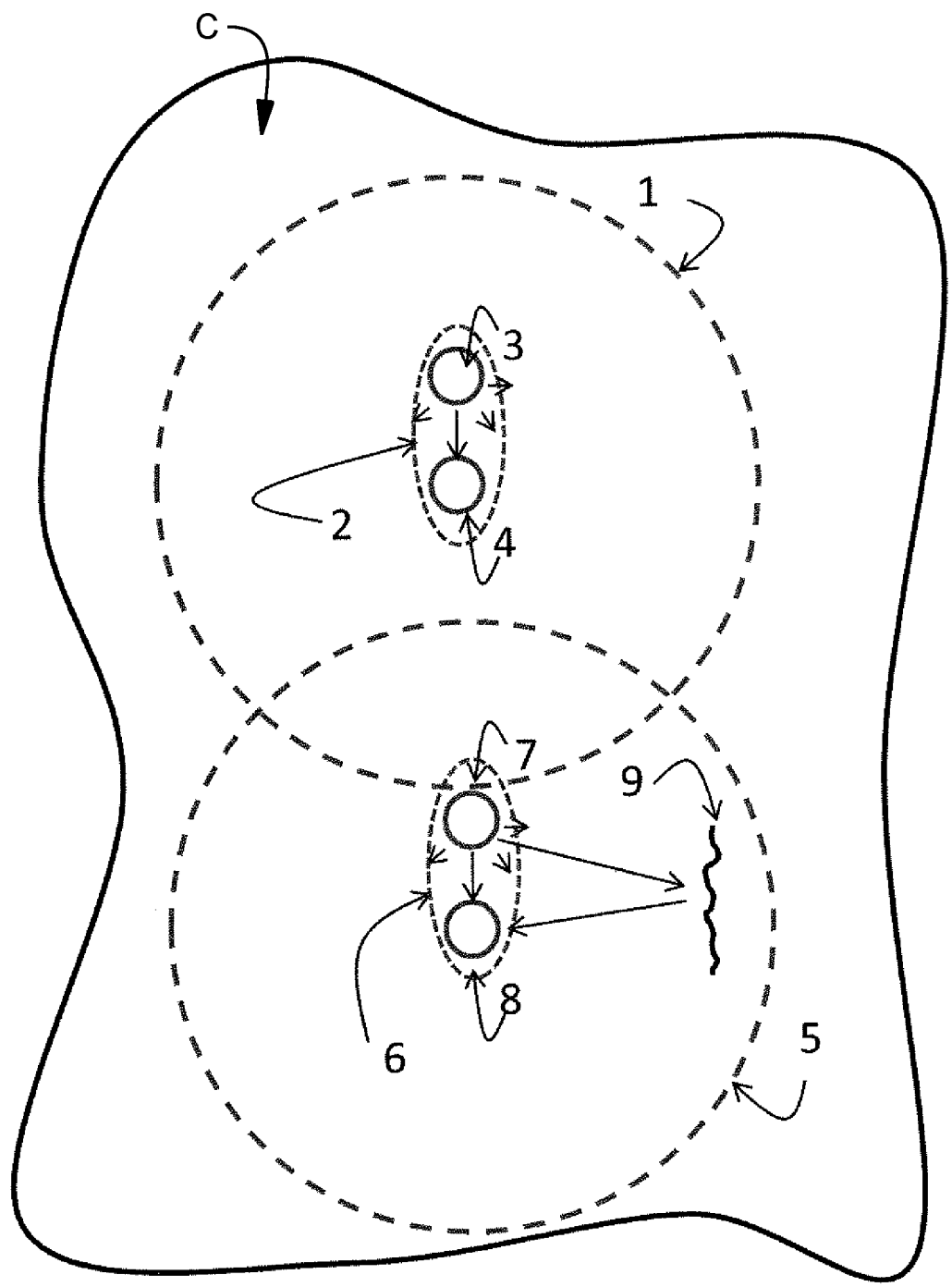
FIG. 3 illustrates measuring in a reference zone and inspected zone of a test object in accordance with an embodiment of the invention.

FIG. 3 illustrates measurements in a reference zone 1 and an inspected zone 5 of the same solid material object C. In this case the reference zone 1 of the solid object C is used as a reference for measurements of another zone, the inspected zone 5 of the same solid object C. The reference zone 1 is flawless, whereas the inspected zone 5 comprises a defect 9. As with the reference object A and inspected object B of FIGS. 1 and 2, the reference zone 1 and the inspected zone 5, of the same solid object C, should have the same material and geometry. The same ultrasonic probes 3, 4 are used in both the reference zone 1 and the inspected zone 5; and consequently sending probe 3 is the same as sending probe 7, and receiving probe 4 is the same as receiving probe 8.

FIGS. 1-3 illustrate two different alternatives. In the first alternative, separate objects are used for the measurements; one first object, i.e. reference object A, is used for providing the reference zone 1 when another second object, i.e. inspected object B, is inspected in the inspected zone 5. In the second alternative, of FIG. 3, the reference zone 1 is provided in the inspected object C, i.e. the same object that is also being inspected in its zone of inspection, i.e. inspected zone 5.

A third alternative is to create a computer model of an object to be inspected, such as a CAD-model ("Computer Aided Design"), for providing a virtual reference zone for comparison of subsequent measurements of the real object, i.e. measurements in an inspected zone 5 of the real object.

Figure 4:
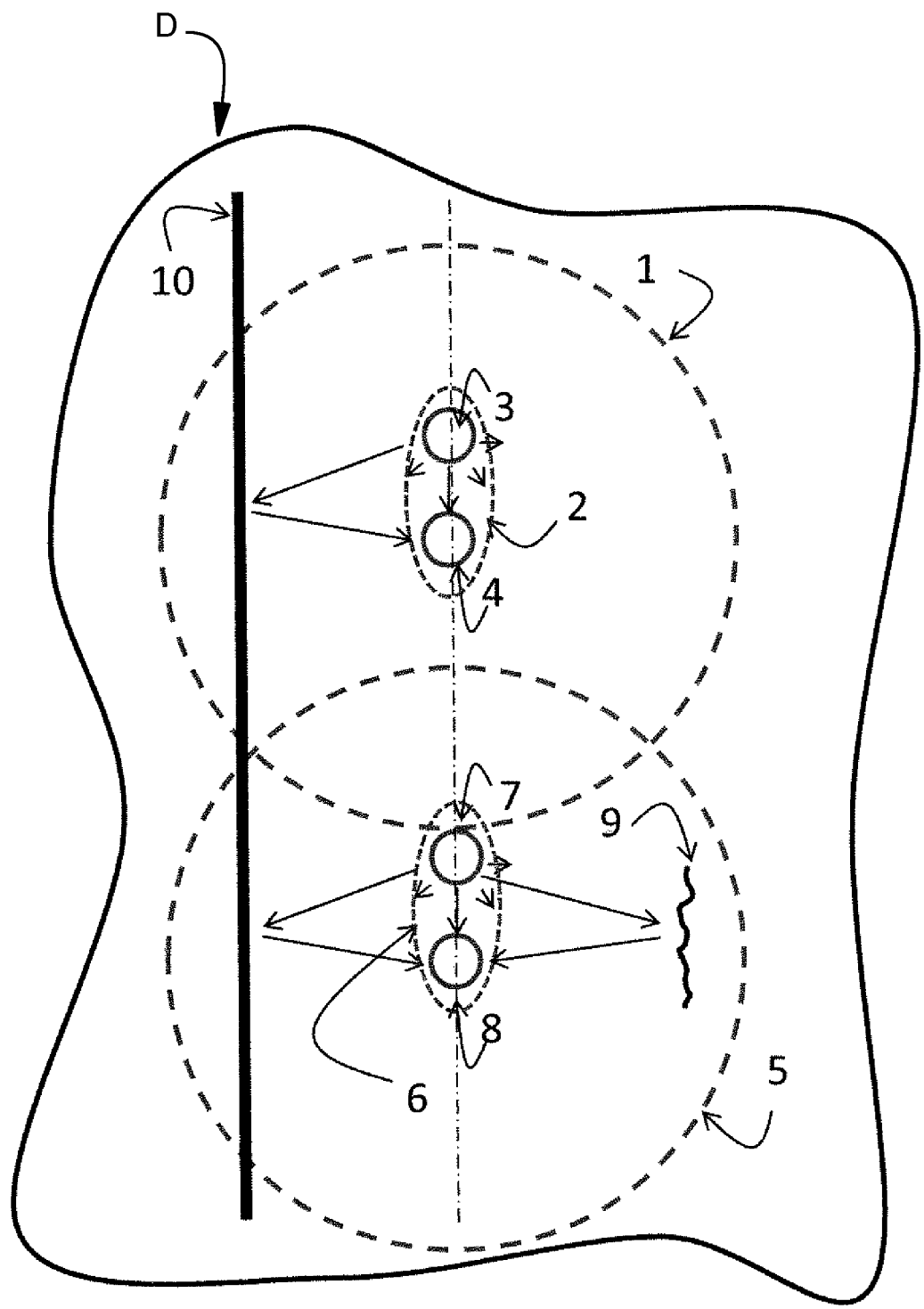
FIG. 4 illustrates measuring in a reference zone and inspected zone of a test object in accordance with an embodiment of the invention.

FIG. 4 illustrates a situation wherein the inspected object D provides a reference zone 1 and an inspected zone 5. In this object D, a known feature 10 that will reflect ultrasonic signals is present in the reference zone 1 and in the inspected zone 5. The direct signals, of the calibration zone 2 of the reference zone 1 and the calibration zone 6 of the inspected zone 5, will not be affected by the feature 10 of the object D. This means that the same measurements as referred to for FIGS. 1, 2 and 3 can be used for a calibration, so that the effect of the differences of contact between the probes and the object can be determined.

The reference signal $r_4(t)$ will not be null after the calibration time due to the echo from the known feature 10, but the influence of a defect 9 can be determined using eq. 16 or eq. 23.

Using eq. 16, the direct signals received during the calibration time period Tc should be used for amplitude normalization and phase shift determination, e.g. by means of cross correlation, of the received signals $r_4(t)$ and $r_8(t)$ in the reference zone 1 and the inspected zone 5, respectively, so that the amplitude of the received reference signal $r_4(t)$ is normalized and the phase difference is compensated for.

Using eq. 23, the direct signals used during the calibration time period TC should be used for determining the filtering effect of the contact surface, as described in eq. 17, and by means of convolution a calibration is performed for the full signals of $r_4(t)$ and $r_8(t)$.

The influence of the known feature 10 can be seen as $A^* e^{j(\Delta)} r_4(t)$ (of eq. 15 and eq. 16) in the received signal $r_8(t)$ in the inspected zone 5 for t>Tc, i.e. after the calibration time period.

In accordance with eq. 23, the known feature 10 can be seen $CF(t)^* r_4(t)$ in the received signal $r_8(t)$ for t>Tc, i.e. after the calibration time period, in the inspected zone 5.

Figure 5A:
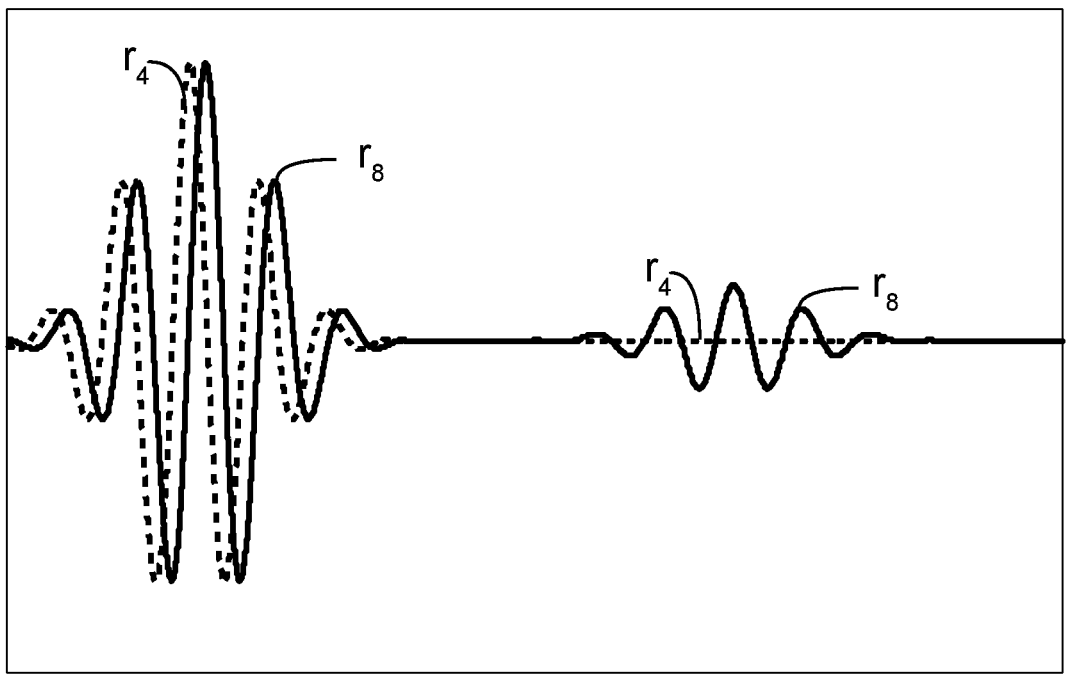
FIG. 5A illustrates a reference signal and an acquired test signal.

FIG. 5A illustrates the received signals $r_4(t)$ and $r_8(t)$ before applying the phase shift. In this example, the amplitudes of $r_4(t)$ and $r_8(t)$ are equal. The residual will indicate the presence of the defect 9 as can be seen by the differences of the two signals $r_4(t)$ and $r_8(t)$ that appear in the reflected signals received after the direct signal. The amplitudes of these differences are however small, so without performing a calibration, the contribution of the defect 9 will be small compared to the overall energy of the signals $r_4(t)$ and $r_8(t)$.

Figure 5B:
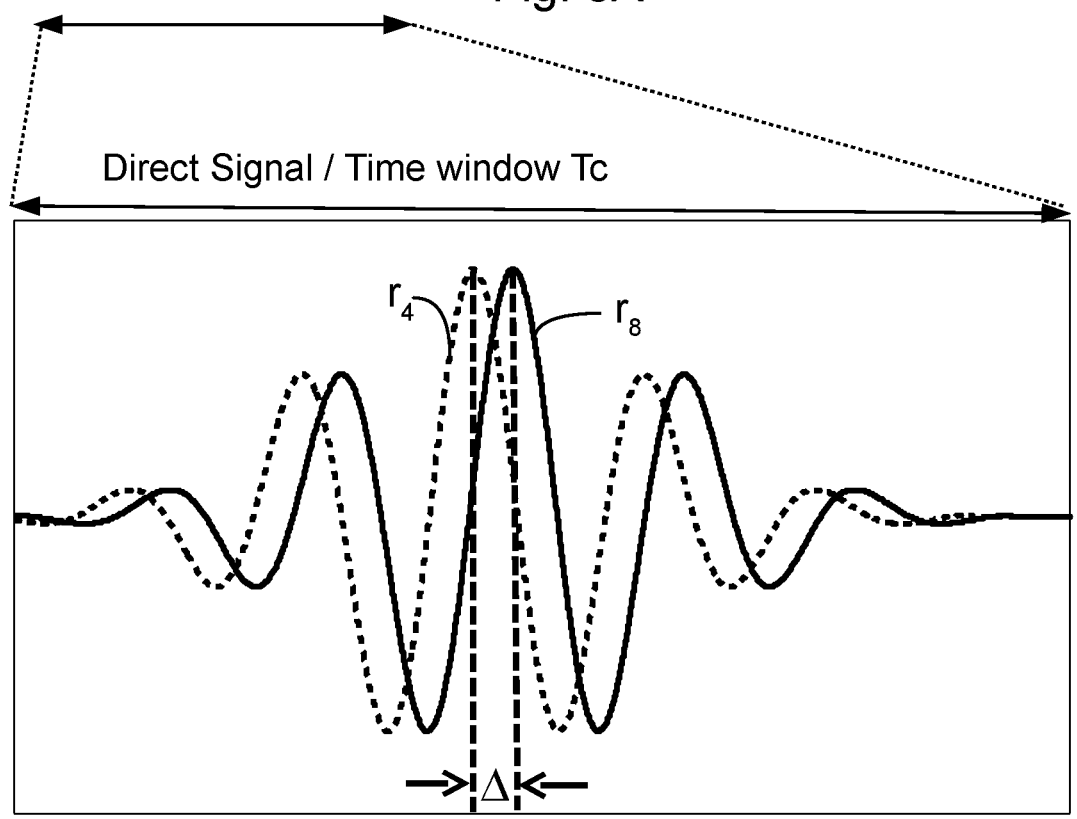
FIG. 5B illustrates a phase shift between the direct signal portion of the reference signal and the direct signal portion of the acquired test signal of FIG. 5A.

FIG. 5B is a time window Tc of the direct signals before performing a calibration, i.e. the received signals $r_4(t)$ and $r_8(t)$ during the calibration time periods. FIG. 5B illustrates the phase difference, or phase shift $\Delta$, between the received signals $r_4(t)$ and $r_8(t)$. Without performing a calibration of these signals $r_4(t)$ and $r_8(t)$ in accordance with the present invention, the subtraction of $r_4(t)$ and $r_8(t)$ would have resulted in large signals compared to the signal reflected by the defect 9.

Figure 6A:
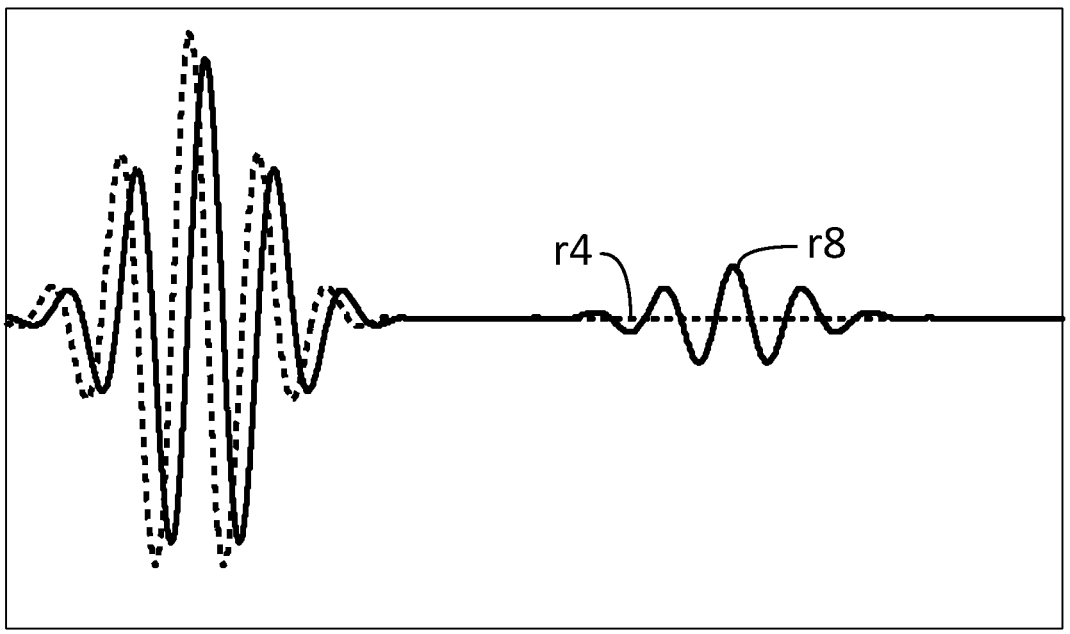
FIG. 6A illustrates a reference signal and an acquired test signal having different phases and amplitudes.

FIG. 6A illustrates an example wherein $r_4(t)$ and $r_8(t)$ have different amplitudes. FIG. 6A illustrate $r_4(t)$ and $r_8(t)$ before applying the amplitude normalization and the phase shift. The residual will indicate the presence of the defect 9 as can be seen by the differences of the two signals $r_4(t)$ and $r_8(t)$ that appear in the reflected signals received after the direct signal. The amplitudes of these differences are however small, so without performing a calibration, which includes amplitude normalization and compensation of the phase shift, the contribution of the defect 9 will be small compared to the overall energy of the signals.

Figure 6B:
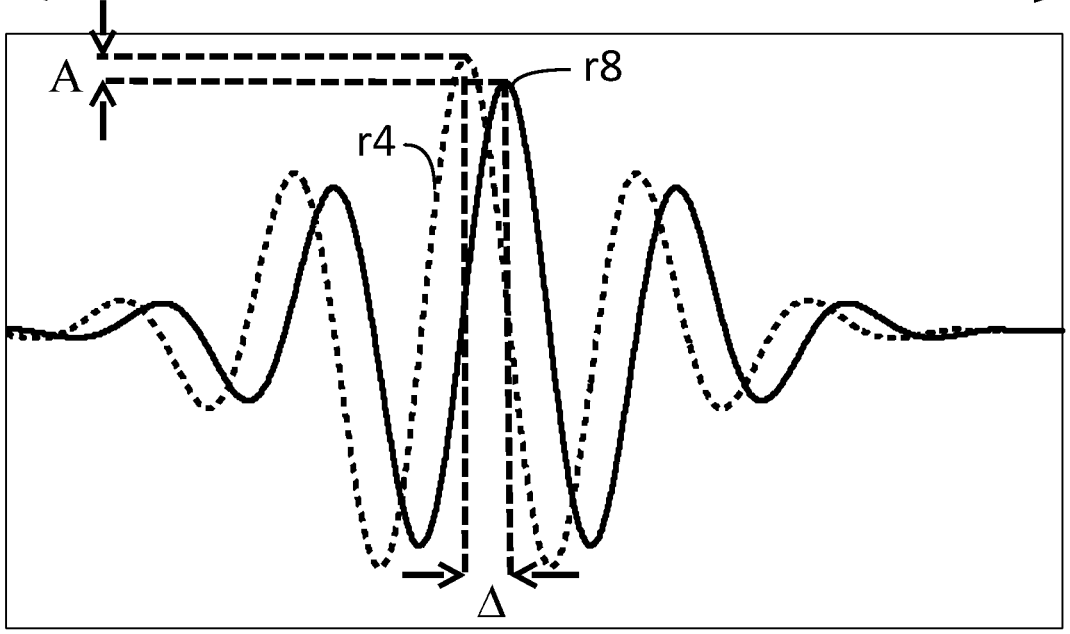
FIG. 6B illustrates the phase shift and amplitude difference between the direct portion of the reference signal and the direct portion of the acquired test signal of FIG. 6A.

FIG. 6B is a time window of the direct signals of FIG. 6A before performing a calibration, i.e. the received signals $r_4(t)$ and $r_8(t)$ during the calibration time periods. FIG. 6B illustrates the phase difference, or phase shift $\Delta$, between the received signals $r_4(t)$ and $r_8(t)$. FIG. 6B also illustrates the amplitude difference, indicated by A, between the received signals $r_4(t)$ and $r_8(t)$. Without performing a calibration of these signals $r_4(t)$ and $r_8(t)$ in accordance with the present invention, the subtraction of $r_4(t)$ and $r_8(t)$ would have resulted in large signals compared to the signal reflected by the defect 9.

Figure 10A:
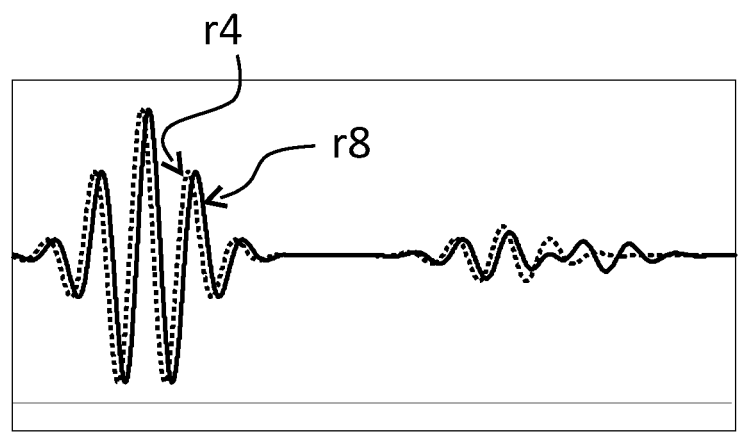
FIG. 10A-10C illustrates a phase shift between a reference signal and a test signal in figure, an uncompensated residual in FIG. 10B and a residual after calibration, in accordance with an embodiment of the invention, in FIG. 10C.
Figure 10B:
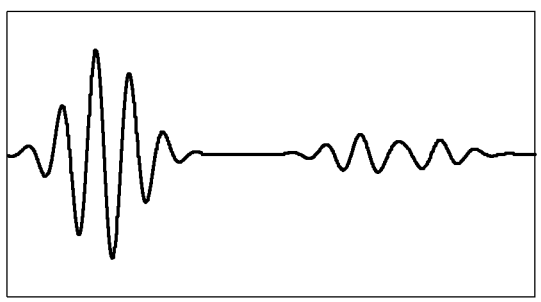
Figure 10C:
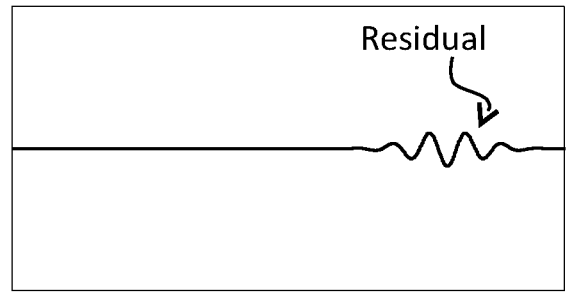

FIGS. 10A-C illustrate how the use of a calibration in accordance with the invention enables obtaining a residual without being influenced with the variations created by the contact between transducers and the surface of the inspected object.

FIG. 10A illustrates the phase shift $\Delta$, similar to FIGS. 5A-B, of the direct signals $r_4(t)$ and $r_8(t)$. The received reference signal $r_4(t)$ includes a reflection from a known feature 10 of a reference zone 1, and the received test signal $r_8(t)$ includes a signal reflected from the known feature 10 and a signal reflected from a defect 9 in the inspected zone 5.

FIG. 10B illustrates a residual, i.e. a test signal after subtraction of the reference baseline signal, that has been computed when a calibration has not been performed. As can be seen, the first portion that includes the direct signal influences the residual significantly. Also, the signal reflected from the defect is influenced by the signal that is reflected from the known feature.

FIG. 10C illustrates a residual after a calibration that includes determining, and compensating for, the phase shift $\Delta$ between the test signal $r_8(t)$ and the reference baseline signal $r_4(t)$. The subtraction after phase compensation provides no contribution, or at least a very small contribution, from the direct signal to the residual. Moreover, the subtraction after compensation does not provide any contribution, or at least a very small contribution, from the signal reflected from the known feature. The reflected signal received after the direct signal, i.e. after the calibration time Tc, can be identified for further analysis. For example, the energy of the residual in FIG. 10C can be determined and compared to a threshold so as to determine if the inspected object contains a defect.

If the residual shown in FIG. 10B was subjected to a comparison with a threshold value for its energy content, the contribution of the defect would have been concealed by the contribution from the direct signal so that the existence of a defect could not have been determined.

FIGS. 7 to 9 illustrate embodiments for implementing the invention. In FIGS. 1-4, the ultrasonic transducers were illustrated as individual sending and receiving probes 3, 7 and 4, 8, respectively. In FIGS. 7 to 9, ultrasonic transducers are arranged in a single measuring device 11 that keeps the transducers 12 in a fixed geometric relation to each other. Measurements can be provided by moving the measuring device 11 on an inspected object, inducing an ultrasonic pulse from one transducer 12 acting as a sending probe 3, 7 and receiving test signals in the other transducers 12 acting as receiving probes 4, 8. During the measurements, every transducer 12 will act alternately as a sending probe 3, 7 and as a receiving probe 4, 8.

Figure 7A:
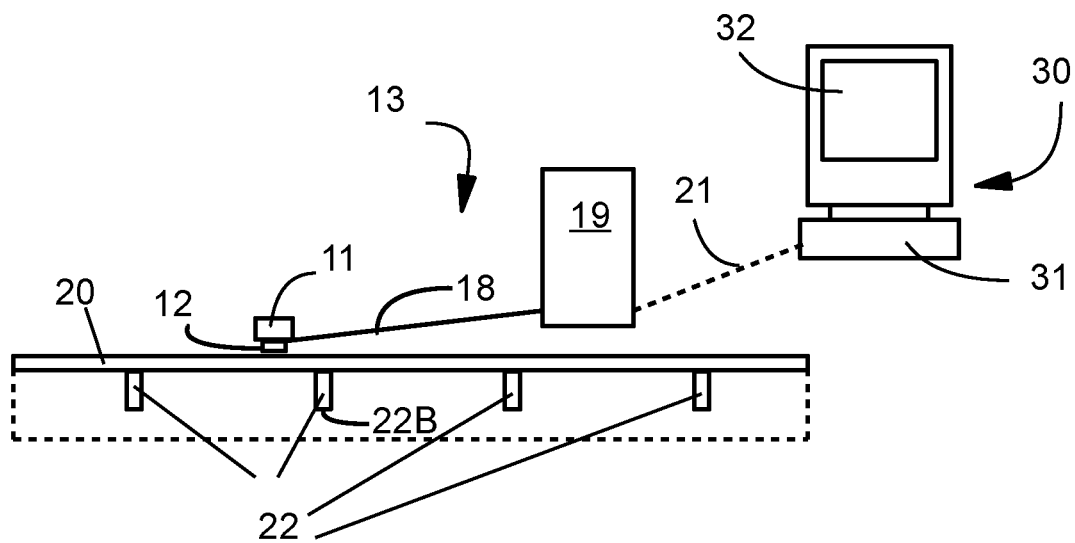
FIGS. 7A-7C illustrates an embodiment of a measuring system in accordance with the invention.

FIG. 7A illustrates a measuring system 13 for inspection of an object 20, made of a solid material, in accordance with the invention. The measuring system 13 comprises a measuring device 11 provided with transducers 12 capable of inducing and receiving ultrasonic signals. The transducers 12 are fixedly mounted in the measuring device 11 and are arranged separated from each other. The FIG. 7A illustrates an inspection process, wherein the measuring device 11 is positioned on the inspected object 20 with the transducers 12 placed in contact with the inspected object 20. The measuring system 13 comprises the measuring device 11 and an ultrasound unit 19, which measuring device 11 and ultrasonic unit 19 are interconnected by cables 18. The ultrasound unit 19 is configured to generate voltage signals to the measuring device 11, and receive voltage signals from the measuring device 11. The transducers 12 provides the conversions between voltage and ultrasound. Each of the transducers 12 is provided to apply an ultrasonic signal to the test object 20 upon receiving a voltage signal from the ultrasound unit 19. Each of the transducers 12 is provided to transmit a voltage signal to the ultrasound unit 19 upon sensing an ultrasound signal in the inspected object 20. The measuring system 13 is configured to obtain test signals from the inspected object 20 by applying an ultrasonic signal by means of one of the transducers 12 and registering the voltage signals from at least one other transducer 12 of the transducers 12. Especially, the measuring device 13 applies a voltage signal to one transducer 12 acting as a sending probe 3, 7 and receives a respective voltage signal from each of the at least one other transducers 12 that acts as a receiving probe 4, 8.

The measuring system 13 is communicatively connected, as indicated by the broken line 21, to a computing device 30. The computing device 30 comprises a computer 31 configured for receiving the measurements and performing an analysis of the measurements. The computing device 30 also comprises a monitor 32 for displaying the results to an operator. The computing device 30 can suitably be configured to obtain reference signals, or alternatively, the computing device 30 should be configured with stored reference signals obtained previously, for example by means of FEM-simulations. The computing device 30 is configured to retrieve the reference signals, so called baseline signals, and configured to compare the obtained test signals with the baseline signals. The computing device 30 may preferably be configured with software for performing reference measurements and inspection measurements. The software should include computer executable instructions for performing a reference measurement, obtaining a reference baseline signal, and storing the baseline signal, as well as instructions for performing inspection measurements, obtaining test signals and comparing the test signals with the stored baseline signals.

When using the measuring system 13, a user position the measuring device 11 at a predetermined position on the test object 20, and the measuring device 11 acquires test signals in that position. The acquired test signals are transferred to the computing device 30 that compares the acquired signals with baseline signals for that position. From this comparison, the computing device is adapted to perform a calibration and determine the residual, such as described by eq. 16 or eq. 23.

The computing device 30 should be configured with, or configured for obtaining, baseline reference signals for each position that should be inspected. As indicated previously, these baseline reference signals can be provided by measuring on a reference object, measuring in a reference zone on the inspected test object or performing calculations from a FEM-model of the test object.

Especially, the computing device 30 is adapted to compensate for variations in the contact area, or zone, between each transducers 12 and the inspected test object 20, i.e. the computing device 30 is adapted to compensate for the effect of different contact interfaces between the reference baseline signal and the test signals of the measurements.

To perform a compensation for different contact interfaces between the measurements of, or calculations of, the reference baseline signal and measurements of the test signals, the computing device 30 may be adapted to compensate for the phase difference, or phase shift $\Delta$, between the reference baseline signal and the test signal from the inspected object 20 as described by eq. 15 and eq. 16. Also, the computing device 30 may be adapted to perform an amplitude compensation such as the described amplitude normalization. In many inspection situations it has been found that the influence from the variations in amplitude, between reference measurements and inspection measurement, is small compared to the influence of the phase shift $\Delta$. Therefore, it may not be necessary to perform compensation of the amplitude.

In other cases a more general model of the filtering effect arising from the contact surfaces should be used in accordance with eq. 16. The computing device 30 may be adapted for both types of compensation. The computing device 30 can suitable be adapted to compensate for the phase shift $\Delta$, check the residual to determine if the compensation is adequate, e.g. check that the residual during the initial time period is approximately null, and apply an amplitude normalization if the compensation is not adequate. The computing device 30 can be adapted to subsequently deduce if the compensation of phase shift and amplitude normalization is adequate, e.g. by checking that the residual during the initial time period is approximately null, and compensate by means of the general filter model of eq. 16 if the compensation is not good enough, e.g. if the residual is not small enough.

When test signals have been acquired for a first position of an inspected zone 5, the measuring device 11 is moved to a second position of the inspected zone 5. The measuring device 11 may be moved continuously or step-wise. The measuring system 13 is configured to use short ultrasonic pulses, and test signals may be obtained at regular intervals during continuous movement of the measuring device 11 in contact with the inspected object 20.

The measuring system 13 is provided with transducers 12 preferably adapted to induce ultrasonic signals at a low ultrasonic frequency, i.e. below 1 MHz. In many solid materials, such as metals like aluminum, such low frequency ultrasonic signals spread while propagating through the solid material. Ultrasonic signal of between 5-10 MHz propagate in a more straight manner, and an advantage of using the low frequency ultrasonic signals of less than 1 MHz is that these signals can spread into and cover a larger portion of the inspected object 20. Moreover, the low frequency ultrasonic signals can be used for inspecting more complicated structures, also at a distance beyond the variations of the structure. The technique, using a reference signal e.g. as obtained from the inspected object or structure, for calibration does not require any "a-priori" knowledge of how the wave propagates in the structure under inspection. That is to say that no knowledge of G(t) in eq 10a, 10b and 11 is needed in order to identify the presence of a defect. This makes possible the inspection of a complicated structure.

The test object 20 inspected in FIG. 1 is a plate-like construction seen from the side and includes beams 22 extending along the bottom side. Using the lower frequency ultrasonic signals, the measuring device 11 may, as illustrated, be placed on an opposite side of the test object 20 compared to the beams 22, and still be able to receive echoes of the ultrasonic test signals travelling into and being reflected in the distal ends 22B, at the bottom surface, of theses beams 22. The beams 22 of the test object 20 may be arranged inside the test object 20, as indicated with the broken contour line. In such a case the beams 22 may not be easily available for inspection, however, using an ultrasonic signal having a low frequency will provide information from the beams 22. Low frequency signals will propagate into each beam 22 and reflected signals from the distal ends 22B of the beams 22 will be received by the measuring device 11.

Figure 7B:
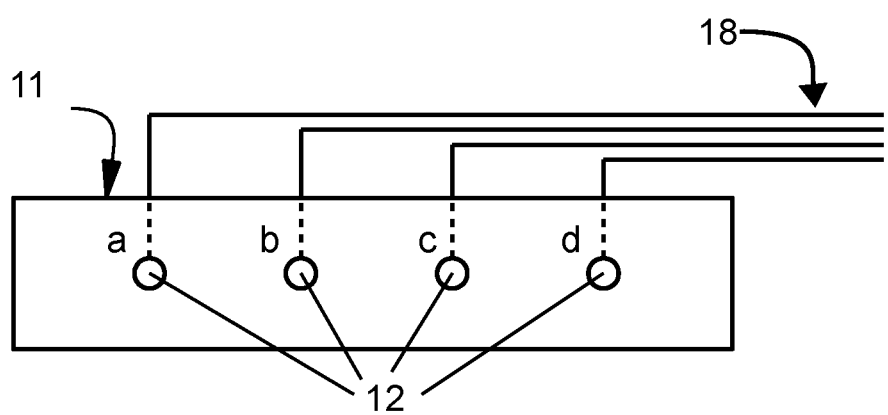
Figure 7C:
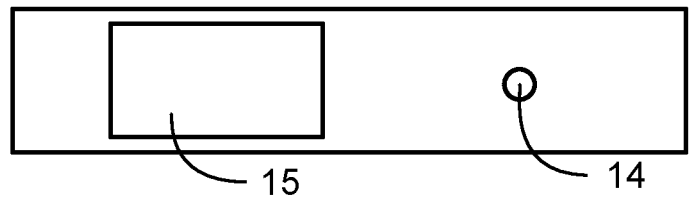

FIGS. 7B and 7C illustrates an embodiment of a measuring device 11 in more detail than FIG. 7A. FIG. 7B illustrates the bottom side of the measuring device 11, which bottom side is provided with an array of transducers 12, at positions a, b, c and d. The transducers 12 protrude slightly from the bottom side to be in contact with the test object 20 that is inspected. The measuring device 11 is provided with four cables 18, one for each transducer 12, and each cable is connected between a respective one of the transducers 12 in positions a-d and the ultrasonic unit 19. Each cable 18 may include a pair of wires, one wire for transmitting and one wire for receiving voltage signals.

FIG. 7C illustrate the top side of the measuring device 11. The top side is provided with a user interface comprising a light emitting unit 14, such as a lamp or LED, and a screen 15. The user interface may alternatively include either a light emitting unit 14 or a screen 15. The user interface 14, 15 may suitable be used for presenting information from the computing device 30 to the operator of the measuring device 11. For example, the computing device 30 may be adapted for determining the size of the determined residual, such as calculating the energy content of the residual signal, and comparing the size with a threshold value. The computing device 30 may also be adapted to transfer a signal to the measuring device 11 indicating a defect when the size of the residual is above the threshold value. As a consequence the user interface 14, 15 of the measuring device 11 may then indicate that the inspected object 20 has a defect by means of for example flashing the light of emitting unit, or change color. The measuring device 11 may also, or alternatively, be equipped with a sound or vibration emitting unit for indicating a defect to the operator.

Figure 8A:
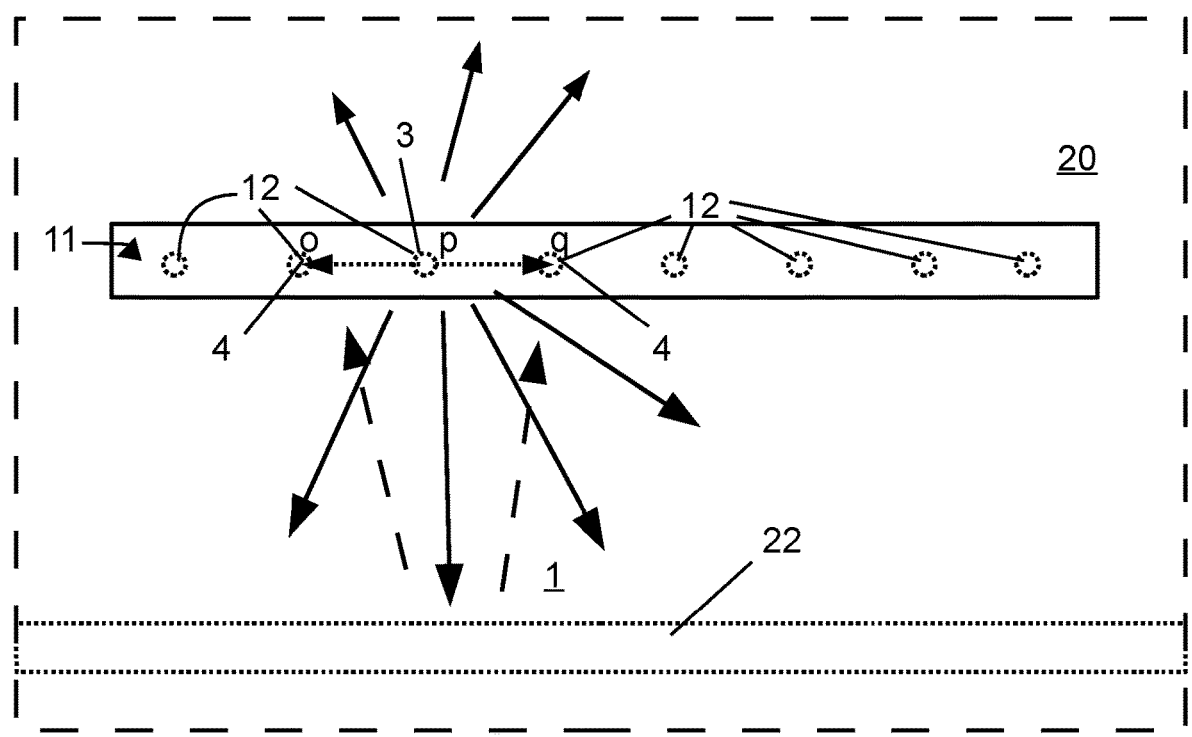
FIGS. 8A-8B illustrates an embodiment of a measuring device in accordance with the invention during inspection.
Figure 8B:
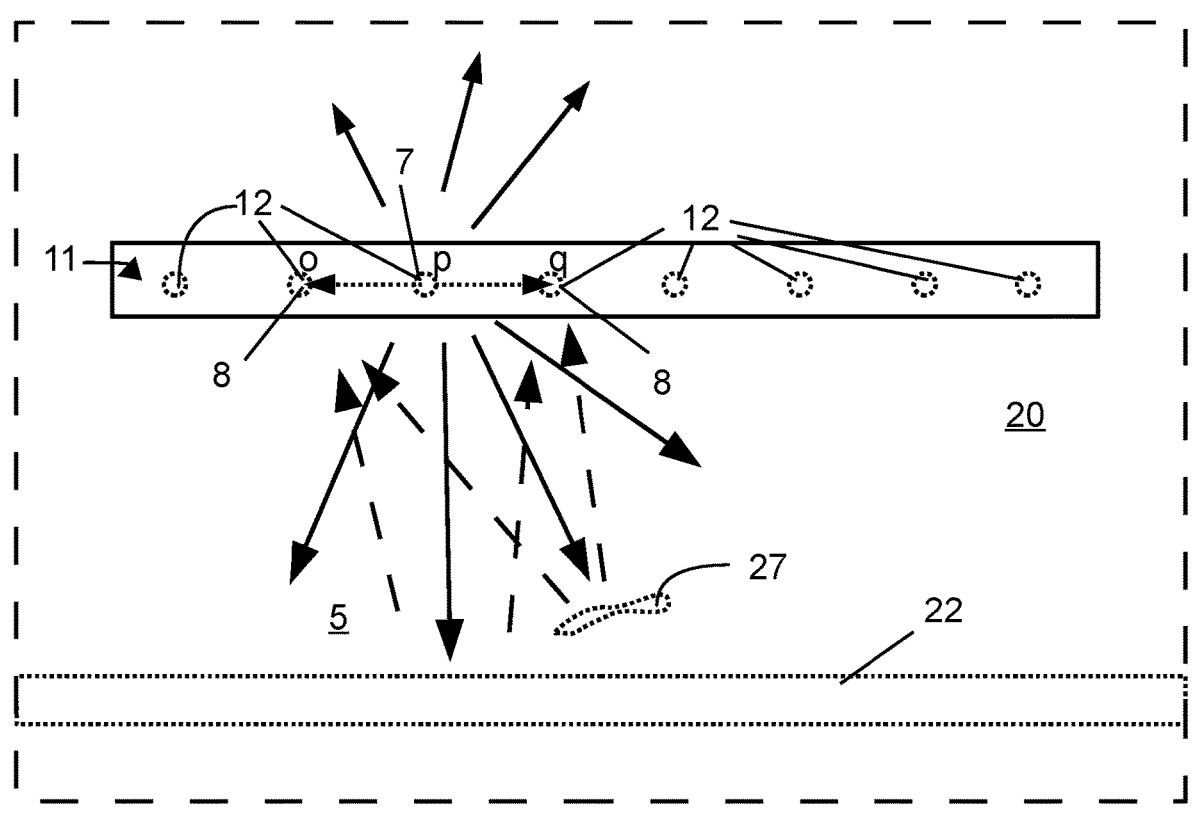

FIGS. 8A and 8B illustrate an embodiment of the measuring device 11 provided with an array of eight transducers 12. The measuring device 11 is illustrated during inspection of an inspected test object 20 having a known feature that reflects the test signals, which known feature is exemplified as the internal beam 22, indicated by broken lines, arranged on the opposite side, i.e. underside, of the inspected object 20. The measuring device 11 is illustrated from above, having the transducers 12, illustrated by broken lines, located on its underside in contact with the inspected object 20.

FIG. 8A illustrates a measurement wherein one transducer 12, at position p, acts as a sending probe 3, 7 and sends an ultrasonic test signal that is received by the neighboring transducers 12, acting as receiving probes, of the sending transducer 12, i.e. the transducers 12 located in positions o and q. The neighboring transducers 12 receives a direct signal, and also a signal reflected from the beam 22.

FIG. 8B illustrates a situation wherein the inspected zone 5 of the inspected object 20 has a defect 27. The ultrasonic test signal from the sending transducer 12, which is located at position p and acts as a sending probe 7, is received by the neighboring transducers 12, i.e. the transducers located in position o and q that acts as receiving probes 8. The signal is received as a direct signal, a signal reflected by the beam 22 and a signal reflected by the defect 27.

The other transducers 12 of the array in FIGS. 8A, 8B may also receive the signal. However, since the direct signals to these signals will pass the neighboring transducers 12 in positions o and q respectively, it is preferred that the non-neighboring transducers 12 are not used for measuring transmissions from their non-neighboring transducer 12 of position p. Thus, it is preferred that only signals from neighboring transducers 12 are used, so as to be able to perform a calibration by means of the direct signals. Each end transducer 12 of the array will only receive and obtain one test signal, whereas each other transducer 12, i.e. each transducer 12 having two neighboring transducers 12, will obtain two test signals, one from each neighboring transducer 12.

Figure 9A:
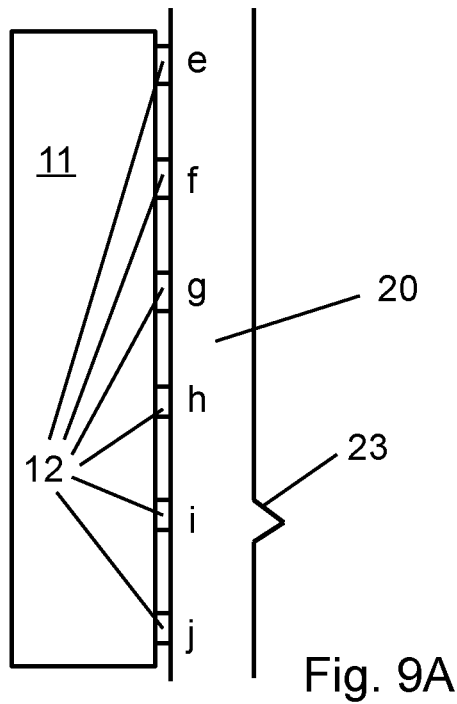
FIGS. 9A-9B illustrates an embodiment of a measuring device and acquired test signals in accordance with the invention.
Figure 9B:
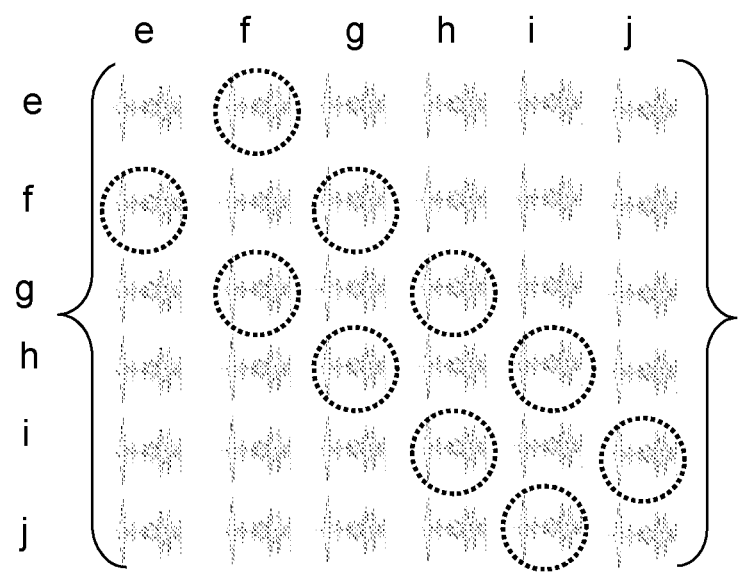

The situation of only using test signals from neighboring transducers 12 is further illustrated in FIGS. 9A and 9B. FIG. 9 is a side view illustrating a measuring device 11 provided with six transducers 12 in an array, located at positions e-j, respectively. The measuring device 12 is positioned in contact with one side of a test object 20 that is inspected. The test object 20 has a feature or defect 23 at its opposite side that will influence the test signal when these are reflected by the opposite side surface of the solid object.

FIG. 9B illustrates test signals arranged in a matrix format. The circled test signals are the ones that are used for the measurements of the test object 20 of FIG. 9A. As illustrated in FIG. 9B, only the test signals received from neighboring transducers 12 are used for the measurements. The transducer 12 at position e receives only the test signal from the transducer 12 located at position f. The transducer 12 at position f receives only the test signals from its neighboring transducers 12 located at positions e and g, etc. The transducer 12 in the other end of the array, located at position j only receives the test signal from one neighboring transducer 12 located at position i.

Figure 11:
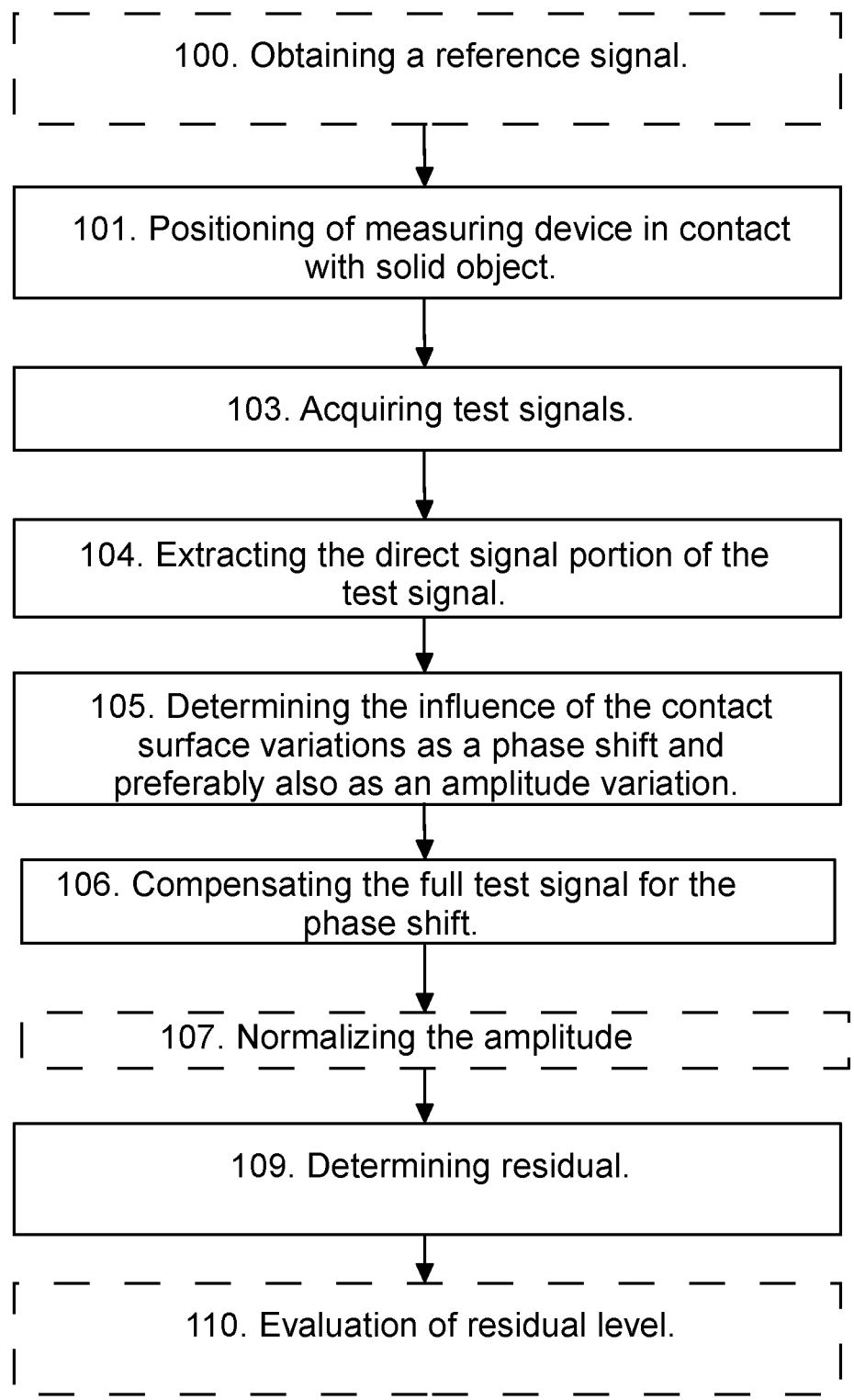
FIG. 11 illustrates a method in accordance with an embodiment of the invention.

FIG. 11 illustrates a method for inspection an object 20 made in a solid material according to embodiments of the invention. Optional steps are indicated by broken lines.

The method for inspecting begins with obtaining 100 a baseline reference signal. The obtaining 100 can preferably be done on a reference zone 1 of a reference object or on a reference zone 1 of the test object. An ultrasonic signal is induced in the reference zone 1 by at least one transducer 12 of the measuring device 11 and received by at least one other transducer 12 of the transducers. Preferably every transducer 12 induces an ultrasonic signal, which ultrasonic signal is received by the transducers 12 that neighbors that sending transducer 12. One reference signal is obtained for each combination of sending transducer 12 and receiving transducer 12 that should be used during the subsequent inspection of the test object. Reference signals are obtained for all positions corresponding to the positions of the subsequent inspection.

An alternative to measuring reference signals is to simulate transmissions in a FEM model of the test object, i.e. simulating transmissions and receptions in the positions of the inspected zone 5.

The inspection of the test object begins by positioning 101 the measuring device with the transducers 12 in contact with the surface of an inspected zone 5 of the inspected object 20.

The inspecting may include measuring at several positions, wherein the inspecting includes moving the measuring device 11 from position to position, in a continuous or step-wise fashion. A residual for each test signal of each position is determined.

After the step of positioning, the inspecting continues with acquiring 103 test signals. Acquiring a test signal includes inducing an ultrasonic signal, such as a short pulse, by means of one of the transducers 12 acting as a sending probe 7 and receiving the ultrasonic signal by means of at least one other transducer 12 acting as a receiving probe 8.

The acquiring 103 includes establishing test signals for every transducer 12 of the measuring device 11 acting as a sending probe 7.

Preferably, each transducer 12 that neighbors the transducer 12 that induces a test signal are used for receiving this test signal. The measurements of the transducers 12 may be controlled by not registering signals from non-neighboring transducers 12.

After acquiring the test signals, the method of inspecting continues with extracting 104 a direct signal portion of each test signal. The extracting 104 preferably includes identifying a time window Tc for the direct signals of each pair of neighboring transducers 12.

The inspecting continues with determining 105 the influence of the contact surface variations between the reference signal and the test signal. The determining 105 is based on the direct signal portions of the reference signal and the corresponding test signal. In the embodiment of FIG. 11, the determining 105 of the contact surface influence is determined as a phase shift for each acquired test signal. The determining 105 includes comparing the direct signal portion of each test signal with the direct signal portion of the corresponding reference signal.

The determining 105 of the influence of the contact surface variations as a phase shift includes comparing the test signal received in the time window Tc with the reference signal of the time window Tc. The comparing may be provided by performing a cross correlation analysis of the test signal and the reference baseline signal, especially the signals of the calibration time window Tc.

After establishing the phase shift, the inspecting continues with compensating 106 for the phase shift. The compensating 106 is made for the full test signal, so that it includes, not only the direct signal portion but also, the reflected signals, i.e. the portion of the test signal received after the time window Tc.

The inspecting may include establishing the time window for the inspection of the inspected zone 5, which time window of the inspection is determined on the basis of the size of the inspected zone 5. The full signals used should end when the time window of the inspection ends.

The inspecting method may continue with normalizing 107 the amplitude of the test signal in relation to the amplitude of the baseline signal. The normalizing 107 of the amplitude is performed by means of the direct signals of the time window Tc. However, for many applications the influence of the phase shift is much greater than the variation of the amplitude, and therefore the inspecting may provide valid measurements performing only compensation 106 of the phase shift for the full signal, even without normalizing 107 the amplitudes.

After compensating 106 for the phase shift the residual is determined 109. If an amplitude normalization 107 has been made, the determining 109 of the residual is performed after the normalization 107.

The determining 109 of the residual includes comparing the full test signal to the full baseline signal. Especially, performing a subtraction of the compensated full test signal and the full baseline signal in accordance with eq. 15 and eq. 16.

The inspecting preferably also includes evaluation 110 of the residual, at least an evaluation of the size of the residual. A size of the residual can be established by determining a measure of the energy of the residual or a measure of the amplitude, such as a mean or maximum amplitude. The size of the residual may be compared to a threshold value. The evaluation preferably includes comparing the residual, or the measure of the residual, to a threshold and presenting the result of the evaluation to the operator, especially indicating to the operator if the residual, or the measure of the residual, exceeds a threshold value. Thus, preferably the computing system 30 performs the evaluation and transmits an indication of a defect to the measuring device 11, which indicates by means of the user interface 14, 15 that a defect has been detected in the inspected zone 5 of the test object 20.

Figure 12:
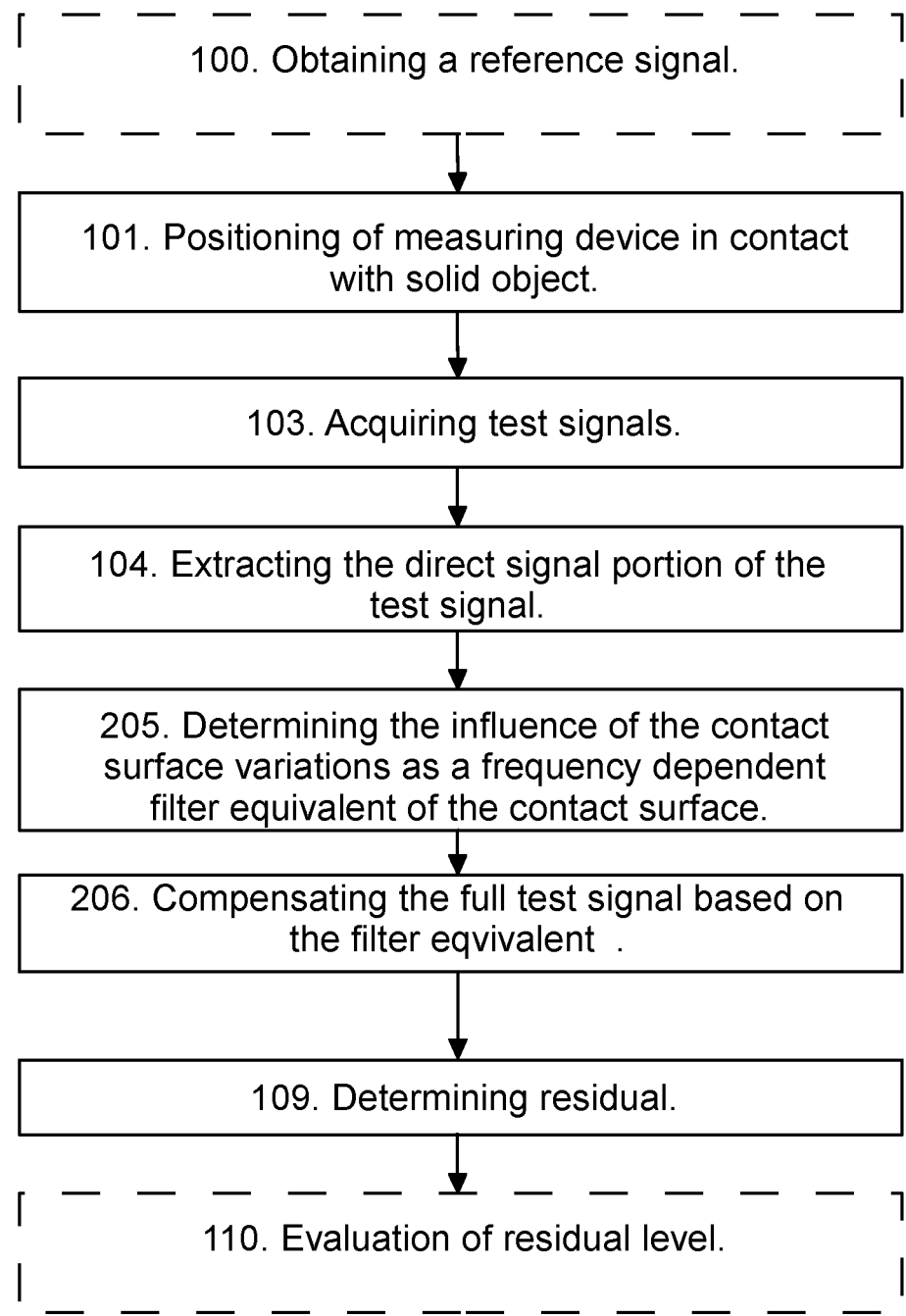
FIG. 12 illustrates a method in accordance with an embodiment of the invention.

FIG. 12 illustrates a method for inspection an object 20 made in a solid material according to embodiments of the invention. The method for inspecting an object 20 of solid material of FIG. 12 is similar to the method of FIG. 11. However, this method of FIG. 12 includes a different step of determining 205 the influence of the contact surface variations and a different step of compensating 206 the test signal.

The inspecting method of FIG. 12 may start with a step of obtaining 100 a reference signal. The method of FIG. 12 continues with the steps of positioning 101 the measuring device, acquiring 103 the test signals and extracting 104 the direct signal portion of each acquired test signal.

The method of inspecting in FIG. 12 continues with a step of determining 205 the influence of contact surface variations between the reference signal and the test signal. This determining 205 is performed by viewing the contact surface variations, preferably in the frequency domain, as a filter. Thus a filter equivalent, in accordance with eq. 17, corresponding to the contact surface variations is established by means of any of the previously identified methods of a) performing a frequency response estimate; b) performing a time domain correlation analysis and c) performing a transfer function estimate.

After determining 205 the influence of the contact surface variation for each of the direct signals, a compensation 206 of each full test signal is performed based on the respective filter equivalent.

As in the inspecting method of FIG. 11, the inspecting method of FIG. 12 includes the step of determining 109 the residual and may include the step of evaluating 110 the residual.

Figure 13:
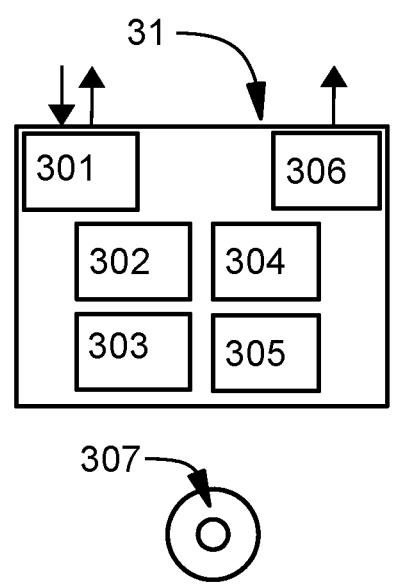
FIG. 13 illustrates embodiments of a computer and software in accordance with the invention.

The computer 31 will be illustrated in more detail with reference to FIG. 13. The computer 31 comprises hardware, such as a processor and memory, and software for handling data when an operator inspects an object 20. Thus, the computer has been adapted for performing functions in accordance with the inspecting methods described in FIGS. 11 and 12 and the measuring system 13 as illustrated in FIG. 1. FIG. 13 is a simplified illustration for showing main features of the computer 31. The hardware and software can be describes as functional units for performing steps of the methods of FIGS. 11 and 12.

The functional units include an ultrasonic controller 301, a measuring unit 302, a calibrator 303, a residual calculator 304, an evaluator 305, and an output 306. The ultrasonic controller 301 comprises means for controlling the ultrasonic unit 19 provided to to transmit signals to and receive signals from the measuring system 13. The output 306 comprises means for returning a result, such as an indication of a defect, to the measuring device 11, and for providing information to the operator by means of the monitor 32. The measuring unit 302 is configured for receiving measurements and storing these, and is adapted for receiving and storing both test signals and reference signals to perform the steps of obtaining 100 a reference signal and acquiring 103 test signals.

The calibrator 303 is configured to extract 104 the direct signal portion of the test signal, determine 105, 205 the influence of the variations of the contact surfaces and compensate 106, 107, 206 the full test signal before the residual is determined by the residual calculator 304. The calibrator 303 may be adapted both for comparing the test signal with a measured reference signal as well as comparing the test signal with a pre-stored reference signal. The calibrator 303 may be adapted to determine 105 the influence of the contact surface as a phase shift and amplitude variation,
compensate 106 the full signal for the phase shift,
compensate 107 the full signal for the amplitude variation; as well as to
determine 205 the influence of the contact surface as a frequency dependent filter, and
compensate 206 the full test signal based on the determined filter equivalent.

The residual calculator 304 is configured to subtract the calibrated test signal from the reference signal in order to provide a residual for further calculations.

The residual evaluator 305 is adapted to determine a measure of the residual signal such as an energy content and may preferably also be adapted for solving the adjoint problem to provide an illustration of the inspected object 20 on the monitor 32 by means of the output 306.

The functional units 301-306 may be implemented in a computer by means of a computer program 307, illustrated as a computer disc, which computer program 307, when run on the computer 31, enables the computer 31 to perform the functions described above.

A method and a system for inspecting objects by means of ultrasound has been provided, wherein reference signals are used as references for test signals in order to establish residual signals indicating flaws in the objects.

The said method comprises positioning (103) a measuring device (11) comprising a plurality of transducers (12) on the inspected object (20) and performing a number of test signal acquisitions (103). Each acquisition includes using one transducer to induce an ultrasonic signal into the test object, and using at least one other transducer to receive an ultrasonic test signal. The inspecting further comprises determining (105, 205) the influence of contact surface variations between each test signal and the reference signal; compensating (106, 206) the full test signal for the influence of contact surface variations; and determining (109) a residual signal based on the compensated test signal.

The system comprises a computing device (30), and a measuring system (13) communicatively connected to the computing device (30). The measuring system (13) includes an ultrasound unit (19) and a measuring device (11) provided with a plurality of transducers (12). The computing device (30) comprises a calibrator (303) configured to determine (105, 205) the influence of contact surface variations, and compensate (106, 206) the test signal for the influence of contact surface variations. The computing device (30) also comprises a residual calculator (304) configured to determine (109) the residual signal based on the compensated test signal and the reference signal.

A computer program has also been provided for enabling a computing device (30) to perform the method steps of the computing device.

All embodiments have been provided for facilitating enabling the invention and are examples only, the scope of the invention is only limited by the claims.

LIST OF REFERENCES

A1 "Flaw imaging with ultrasound: the time domain topological gradient method" by N. Dominguez et al, AIP Conference Proceedings, 2005, pages 859-866. (http://dx.doi.org/10.1063/1.1916764)
A2 "Time domain topological gradient and time reversal analogy: an inverse method for ultrasonic target detection" by N. Dominguez et al, Wave Motion, Vol. 42, No. 1. June 2005, pages 31-52. (http://dx.doi.org/10.1016/j.wavemoti.2004.09.005)
A3 "System identification, Theory for user", by L. Ljung, Prentice Hall, 1998.

The invention claimed is:

1. A method for inspecting objects by means of ultrasound, wherein reference signals are used as references for test signals in order to establish one or more residuals indicating flaws in the objects, said method comprising:
inspecting an object at one or more positions, the inspecting of one position comprises:
positioning a measuring device comprising a plurality of transducers in a selected position on the inspected object, so that the ultrasonic transducers are in contact with the inspected object,
performing a number of test signal acquisitions at the selected position, each test signal acquisition comprising:
using one transducer of the plurality transducers as a sending probe to induce an ultrasonic signal into the inspected object, and using at least one other transducer of the transducers as a receiving probe to receive ultrasonic signals from the inspected object, so that one test signal is obtained for each combination of sending probe and receiving probe;
said inspecting of one position further comprising:
determining an influence of contact surface variations between each test signal and a corresponding reference signal for each combination of sending probe and receiving probe, wherein the determining of the influence of contact surface variations is based on a direct signal portion of the test signal and a corresponding direct signal portion of the reference signal;

compensating the test signal for the influence of contact surface variations; and determining a residual of the one or more residuals based on the compensated test signal for each combination of sending probe and receiving probe.

2. The method of claim 1, including extracting the direct signal portion of the test signal.

3. The method of claim 1, wherein determining the influence of contact surface variations includes determining a frequency varying filter equivalent for the contact surface, and wherein the compensating includes compensating the full test signal on the basis of the determined filter equivalent.

4. The method according to claim 1, including obtaining the corresponding reference signal from a reference zone of the test object, or from a reference zone of a reference object.

5. The method according to claim 1, wherein the induced ultrasound signal has a frequency of less than 1 MHz.

6. The method of claim 1, wherein the step of determining the influence of contact surface variations comprises determining a phase shift ($\Delta$) between the test signal and the corresponding reference signal, and wherein compensating includes compensating the test signal for the determined phase shift ($\Delta$).

7. The method of claim 6, wherein the step of determining the influence of contact surface variations comprises determining an amplitude variation between the test signal and the corresponding reference signal, and wherein the method further includes normalizing the amplitude of the test signal and/or the corresponding reference signal in accordance with the determined amplitude variation.

8. The method of claim 1, including evaluating one or more levels of the residual.

9. The method of claim 8, wherein the evaluating includes comparing at least one of the residual and a measure of the residual to a threshold, and indicating to an operator when at least one of the residual and the measure of the residual exceeds the threshold.

10. A system for inspecting an object using ultrasound comprising:
    a computer, and
    a measuring system configured to acquire test signals from an inspected object, which measuring system is communicatively connected to the computer for transferring the test signals from the measuring system to the computer, wherein
    said measuring system includes a plurality of transducers, wherein each test signal is obtained by using one of the transducers as a sending probe and another one of the transducers as a receiving probe, so that a respective test signal is obtained for each combination of sending probe and receiving probe, and
    said computer includes a processor configured to establish one or more residuals by comparing each test signal with a corresponding reference signal in order to detect flaws in the inspected object,
    wherein the processor is further configured to:
        determine an influence of contact surface variations between each test signal and the corresponding reference signal by using a direct signal portion of the test signal and a direct signal portion of the corresponding reference signal,
        compensate the test signal for the influence of contact surface variations; and
        to determine a residual based on the compensated test signal and the corresponding reference signal.

11. A system for inspecting an object according to claim 10, wherein the computer is configured to determine the influence of contact surface variations by determining a frequency varying filter equivalent and compensate the full test signal on the basis of the determined filter equivalent.

12. A system for inspecting an object according to claim 10, wherein the computer is configured to compare at least one of the a measure of the residual and the residual to a threshold, and to provide an output configured for indicating to an operator when at least one of the measure of the residual and the residual exceed the threshold.

13. A system for inspecting an object according to claim 10, wherein each said sending probe provides ultrasound signals at a frequency of less than 1 MHz.

14. A system for inspecting an object according to claim 10, wherein the processor is configured to determine the influence of contact surface variations by determining a phase shift ($\Delta$) between the test signal and the reference signal, and compensate the test signal for the determined phase shift ($\Delta$).

15. A system for inspecting an object according to claim 14, wherein the processor is further configured to determine the influence of contact surface variations by determining an amplitude difference between the test signal and the corresponding reference signal, and to compensate the test signal by performing an amplitude normalization of the test signal and the corresponding reference signal.

16. A computer program product embodied in a non-transitory computer readable storage medium for determining a residual from test signals acquired by means of ultrasound from a sending probe in contact with a surface of an inspected object to induce the test signals and reference signals into the inspected object and a receiving probe in contact with the surface of the inspected object to receive the test signals and reference signals from the inspected object, which computer program product comprises a computer program that when run on a processor of a computer enables the processor to perform the steps of:
    extracting a direct signal portion of each test signal;
    determining an influence of contact surface variations between the direct signal portion of each test signal and a corresponding portion of an associated reference signal;
    compensating each test signal for the influence of contact surface variations; and
    determining a residual based on each compensated test signal and the associated reference signal.

17. A computer program product according to claim 16, wherein the step of determining the influence of contact surface variations comprises determining a frequency varying filter equivalent for the contact surface, and wherein the compensating includes compensating the test signal on the basis of the determined filter equivalent.

18. A computer program product according to claim 16, wherein the step of determining the influence of contact surface variations comprises determining a phase shift ($\Delta$) between the test signal and the reference signal, and determining an amplitude difference between the test signal and the reference signal, and
    wherein the step of compensating includes compensating the test signal for the determined phase shift ($\Delta$), and normalizing the amplitude of the test signal and/or the reference signal in accordance with the determined amplitude difference.

* * * * *